(12) United States Patent
Meeker et al.

(10) Patent No.: US 9,450,826 B2
(45) Date of Patent: *Sep. 20, 2016

(54) DEVICE CONNECTIVITY FRAMEWORK

(71) Applicants: David Meeker, Chicago, IL (US);
Adam Flater, Denver, CO (US);
Chandrasekar Raju, Chicago, IL (US);
Jordan Snyder, Rollinsville, CO (US)

(72) Inventors: David Meeker, Chicago, IL (US);
Adam Flater, Denver, CO (US);
Chandrasekar Raju, Chicago, IL (US);
Jordan Snyder, Rollinsville, CO (US)

(73) Assignee: Rooundarch Corporation, Chicago, IL (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/512,876

(22) Filed: Oct. 13, 2014

(65) Prior Publication Data

US 2016/0105319 A1    Apr. 14, 2016

Related U.S. Application Data

(63) Continuation of application No. 13/402,083, filed on Feb. 22, 2012, now Pat. No. 8,863,150.

(51) Int. Cl.
*G06F 15/16* (2006.01)
*H04L 12/24* (2006.01)
*H04L 29/06* (2006.01)

(52) U.S. Cl.
CPC ........ *H04L 41/0846* (2013.01); *H04L 41/082* (2013.01); *H04L 41/0889* (2013.01); *H04L 69/08* (2013.01)

(58) Field of Classification Search
CPC ....................................... H04L 69/08
See application file for complete search history.

(56) References Cited

U.S. PATENT DOCUMENTS

2008/0104189 A1* 5/2008 Baker .................... G05B 19/05
709/206
2009/0254601 A1* 10/2009 Moeller .................. G06F 9/542
709/201

* cited by examiner

*Primary Examiner* — Vivek Srivastava
*Assistant Examiner* — Nicholas Celani
(74) *Attorney, Agent, or Firm* — Niro Law, Ltd

(57) ABSTRACT

A system and method for providing a device agnostic framework between two or more computing platforms. The system includes a protocol for creating device agnostic messages including data from a message generated by an application on the first computing platform, as well as identification and targeting data to enable the message to be sent to the intend target computing platform. The intended target computing platform responds via a callback, thereby establishing a communication protocol between the first and second computing platforms regardless of different computing languages or hardware being used.

3 Claims, 4 Drawing Sheets

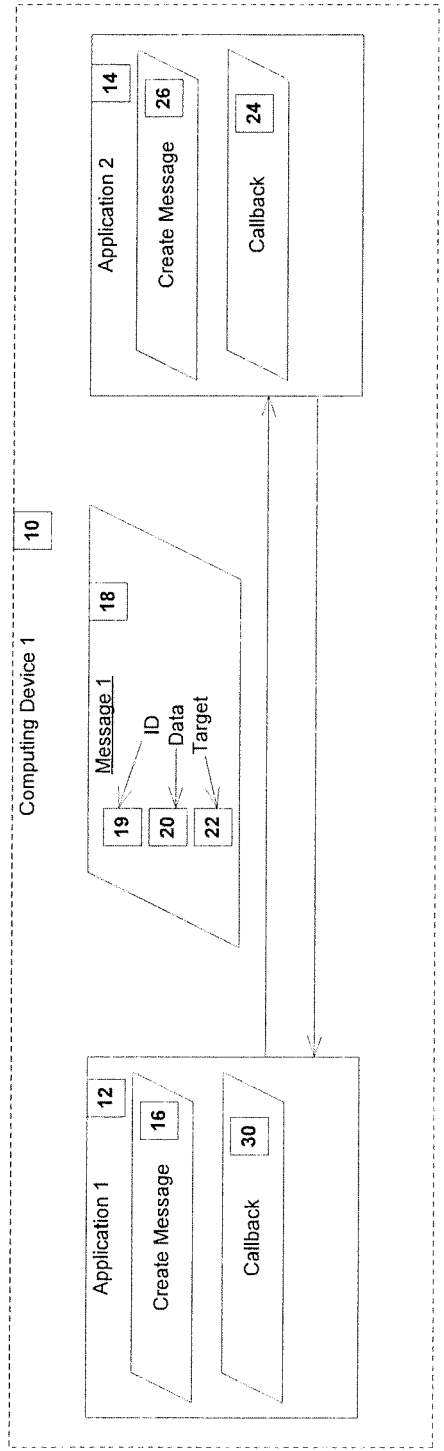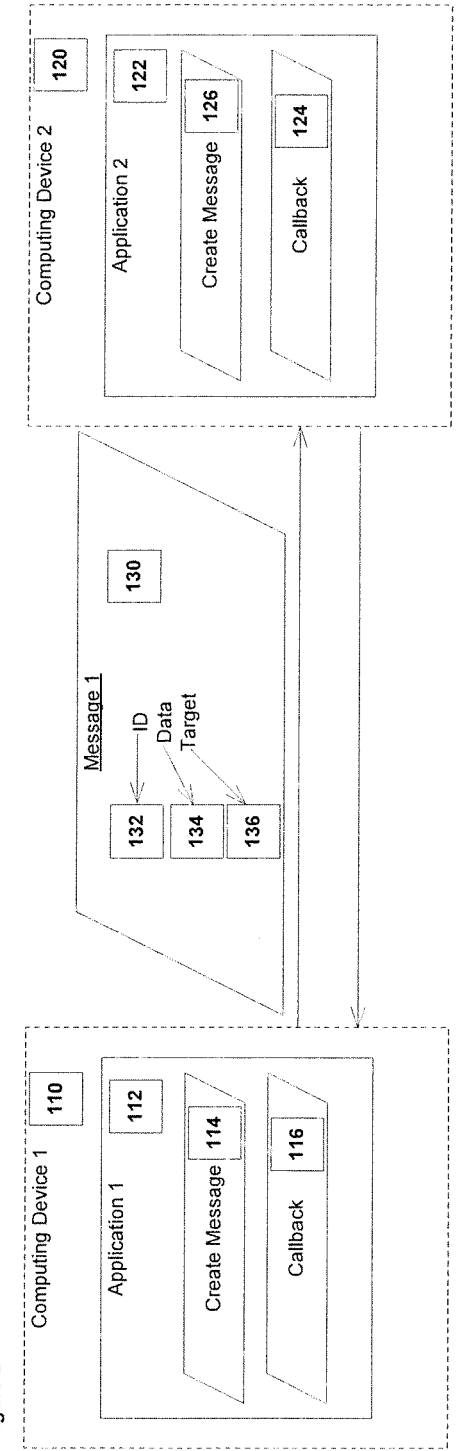

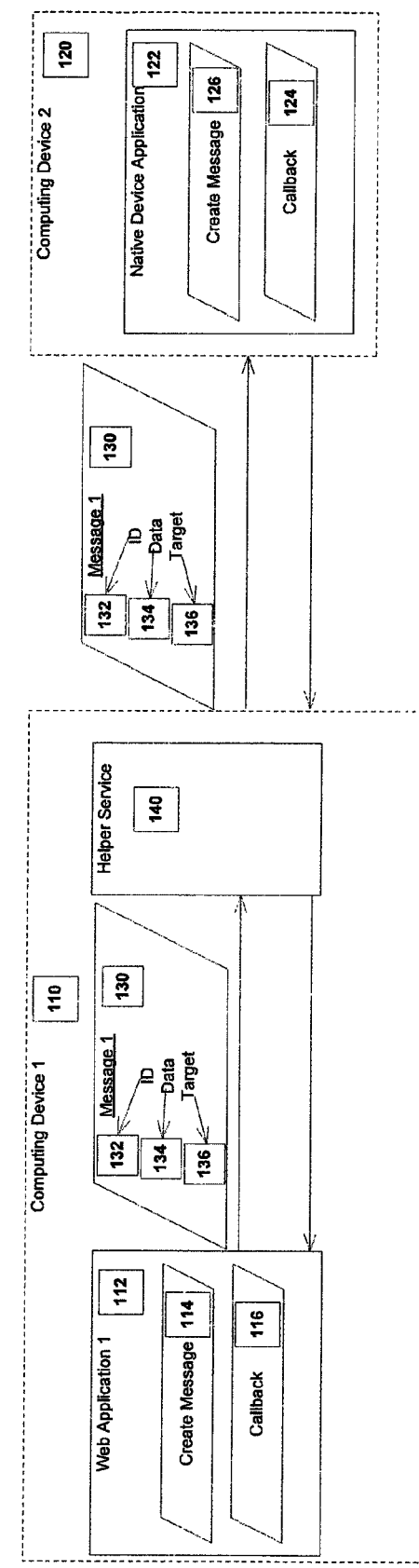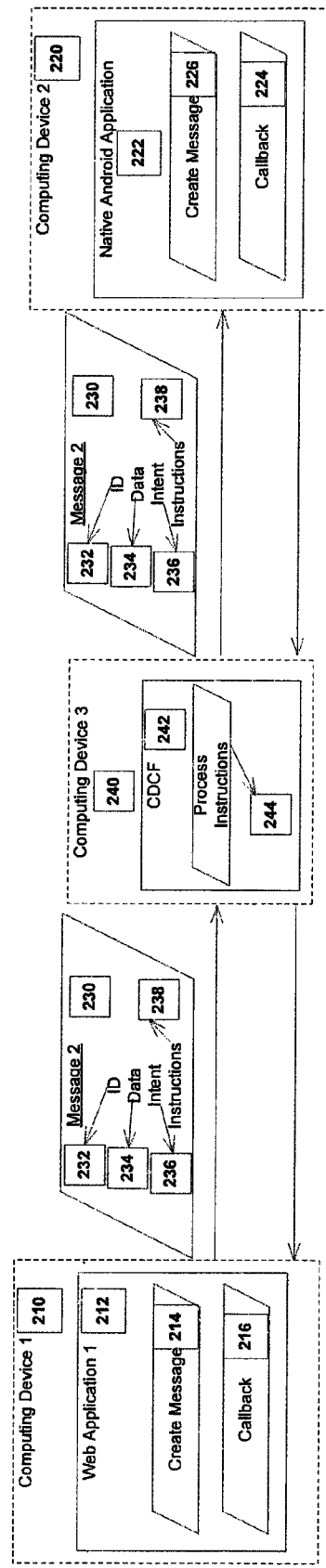

DEVICE CONNECTIVITY FRAMEWORK

FIELD OF THE INVENTION

The present invention relates to a system and method for providing a multilingual computer framework for sending and receiving messages comprised of objects between different devices and/or operating systems. Specifically, the present invention includes an improved device connectivity framework, which is a system for facilitating communication between two or more software platforms without the need for common computer languages, common operating systems or even common hardware. The system and method includes the use of computerized translation data using a common protocol, the translation data being attached to a message being sent from one software platform to another software platform. This framework thus provides the ability to connect software applications that are aware of one another & can exchange data with other applications that utilize the same framework or protocol. The present invention has particular applicability in any field where there is a need for bridging a communication gap between computer applications.

BACKGROUND OF THE INVENTION

Computer applications offer a wide variety of functionality capabilities, each with their own fortes and limitations. In addition, the increase in internet connectivity (especially in mobile applications) has resulted in an increase in web based computer programs. One such class of applications are known as Rich Internet Applications, or RIAs. An RIA is a Web application that has many of the characteristics of desktop application software, typically delivered either by way of a site-specific browser, via a browser plug-in, independent sandboxes, use of JavaScript, or virtual machines. Adobe Flash, JavaFX, and Microsoft Silverlight are currently the three most common platforms, with desktop browser penetration rates around 96%, 76%, and 66% respectively as of August 2011. Mobile phone penetration of these plugins, however, has remained low even as internet traffic from these devices has grown. Although new Web standards have emerged, they still use the principles behind RIAs. Users generally need to install a software framework using the computer's operating system before launching the application, which typically downloads, updates, verifies and executes the RIA.

A further problem with such software usage is the limitations of frameworks and similar mechanisms for facilitating such connections are platform dependent. For example, a given RIA cannot use the same framework to permit an application to communicate equally with a Java based application and a Flash based application. This limitation, understandably, limits the utility of RIAs and the potential they offer to users and content providers alike.

Thus, the present state of the art reflects a need for a device connectivity framework which operates with browser based access to native application code, as well as having the ability to enable such communication without regard to the software platforms involved.

DESCRIPTION OF THE PRIOR ART

One example of a prior art approach is found in Microsoft's OLE technology, as well as its successors MS ActiveX and Microsoft's .NET initiative. The .NET initiative includes Microsoft Silverlight, a graphical user interface technology that enables user-experience driven applications to run both inside and outside of the Web browser. ActiveX controls allow for browser-based HTML applications to communicate with applications running on a client computer and external resources. However, ActiveX requires the MS Internet explorer browser and the MS Windows operating system, along with client code created to run on the Windows environment.

Another prior art approach was made available by the present inventors through the Merapi Project. Merapi is a Java™ application, intended to run on a user's (client) computer. Merapi connects other Java applications on the user's computer to Adobe AIR™ applications that the user has installed. With Merapi, the Adobe AIR application must be developed in a way that allows it to connect to Merapi. Merapi acts as a "middle man", passing objects between a user's AIR application and a Java application. The Merapi Project is thus a software "bridge" that allows Adobe AIR (psuedo-desktop/thin-client) applications to use native code, written in Java, at runtime, on the same local machine on which the AIR application is being run. However, the Merapi Project fails to enable or suggest browser-based access to native code. Likewise, the Merapi Project fails to teach the ability to execute native code other than Java.

What is needed is a device and platform agnostic computer communication system between multiple software platforms which includes browser based access to native code.

DEFINITION OF TERMS

The following terms are used in the claims of the patent as filed and are intended to have their broadest plain and ordinary meaning consistent with the requirements of the law.

A "device agnostic message" is computerized communication data provided to an intended target which includes or is derived from at least both native data from a computer platform sending the communication as well as translation data such that the message may be processed by the intended target.

"Computerized instruction data" is a command or communication derived from an application on a first software platform which is made available to a second software platform.

"Target information" is information which identifies the intended recipient(s) of a given device agnostic message. Such information may include, but is not limited to information specifying a particular computer address and/or computer communication port.

"Translation data" is computerized information which allows processing of the computerized instruction data in a device agnostic message to be processed by a given target software platform without requiring the native application for such computerized instruction data.

Where alternative meanings are possible, the broadest meaning is intended. All words used in the claims set forth below are intended to be used in the normal, customary usage of grammar and the English language.

OBJECTS AND SUMMARY OF THE INVENTION

The apparatus and method of the present invention generally includes a computer platform agnostic device connectivity framework for enabling computer messages to flow between at least a first computer platform and a second computer platform without need for any common hardware or software applications or languages. The frame typically includes the creation of a message by a first application, the appendage or creation of a device agnostic message using the message by the first application and attaching identification a d/or target data thereto, sending the device to an intended target using the identification and/or target data, and receive of a response message or callback message from the intended target acknowledging receipt of the device agnostic message.

An immediate application of one embodiment of the present invention will be seen in enabling communications from a first software platform (e.g., a desktop application such as an Adobe Flash application) to a remote, second software platform (e.g., a mobile phone application such as an Android application). However, those of skill will understand that certain objects of the present invention will similarly be met through a second embodiment wherein the first and second software platforms reside on the same device (e.g., by providing device agnostic messages through a communications port between two applications using different languages but residing on the same desktop computer).

Thus can be seen that one object of the present invention is to provide a device connectivity framework or method and system which enables communications with and instruction data being provided from a first computer platform to a second computer platform regardless of whether the two platforms employ the same applications, language or hardware.

A further object of the present invention is to provide a system and method for enabling remote communication of computer instructions between two different software platforms without requiring common software languages or applications.

Still another object of the present invention is to provide a system and method which enables the coding of computer instructions from a first application such that they can be operated upon by a recipient computer regardless of the applications native to the recipient computer.

Yet another object of the present invention is to provide a system and method whereby a web application, such as a browser, can communicate with and process instructions from a native device application on the same or a different computer regardless of the language used by the native device application.

Still another object of the present invention is to provide a system and method which enables a distributed connectivity framework architecture which uses an intermediate device (including cloud or internet connected hardware devices) to enable the passage of instructions and communications between two different applications on two different remote computing devices without requiring the same applications to reside on such computing devices.

It should be noted that not every embodiment of the claimed invention will accomplish each of the objects of the invention set forth above. In addition, further objects of the invention will become apparent based the summary of the invention, the detailed description of preferred embodiments, and as illustrated in the accompanying drawings. Such objects, features, and advantages of the present invention will become more apparent in light of the following detailed description of a best mode embodiment thereof, and as illustrated in the accompanying drawings.

BRIEF DESCRIPTION OF THE DRAWINGS

FIG. 1 shows an operational schematic of a first preferred embodiment of the device connectivity framework operating between two applications on the same device.

FIG. 2 shows an operational schematic of a second preferred embodiment of the device connectivity operating between two applications on two different remote devices.

FIG. 7 shows a further example of the second preferred embodiment of the device connectivity framework enabling communications between a web application on a first computing device and a native application on a second, remote computing device.

FIG. 8 shows an example of a third preferred embodiment of the device connectivity framework enabling communications between a web application on a first computing device and a native application on a second, remote computing device via a cloud device connectivity framework.

DETAILED DESCRIPTION OF THE INVENTION

Figure 3:
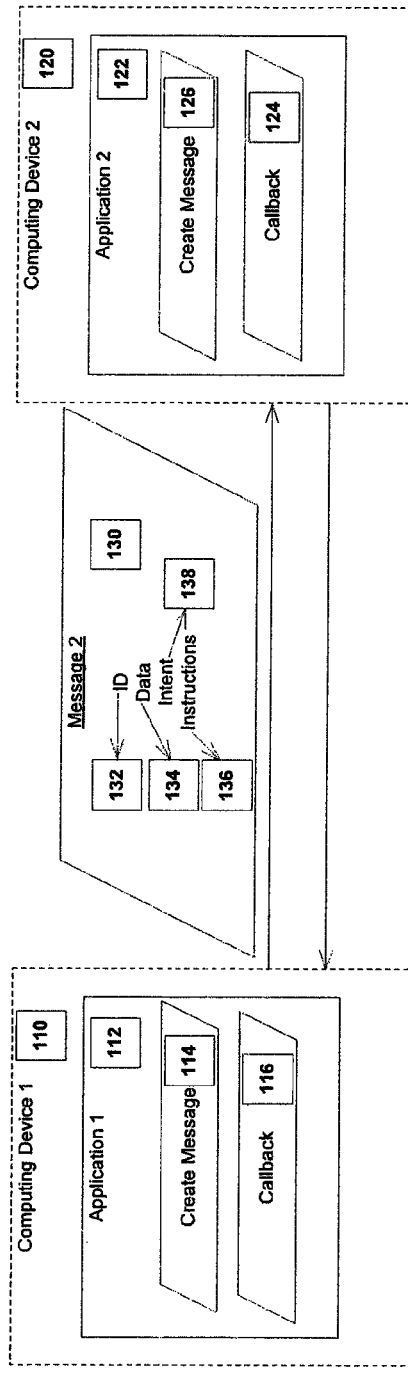
FIG. 3 shows a variant of the second preferred embodiment with additional data types contained with the device agnostic message.

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

A first embodiment of the present invention is shown in FIG. 1, which addresses a situation in which there exists a need for communication between a web application and a native computer application on a single hardware device. For instance, in this embodiment, a user might wish to access a first proprietary, legacy application on a hardware device using a second software application (e.g., a web browser or other application) in order to provide a superior graphical user interface without requiring the hardware device going out to a server. In such an embodiment the device connectivity framework system occurs within the confines of a first computing device 10, such as a desktop, laptop, tablet, or handheld computer (e.g., a smartphone). Residing on the first computing device 10 are a first application 12 and a second application 14. The ability to communicate between the two applications in accord with the method and system of the present invention, i.e., without requiring a common language or without operating through an outside server, begins with the step of the first application creating a message 16, e.g., generating an instruction or communication intended for the second application. The message 16 requires the step of creating a device agnostic message 18. This device agnostic message 18 includes data 20 derived from the step of creating a message, and adds to that data a unique identifier or ID 19 that identifies the intended target of the device agnostic message, and further adds a device address 22, which in the example of this first preferred embodiment could simply be the identification of a designated communications portal (socket) which would be used for handling the device agnostic messages of the present invention.

In response to receiving the device agnostic message 18, the second application 14 would most preferably generate a callback 24 which is passed back from the second application to the first application 12. The callback, in one example of the first embodiment, could simply be verification to the first application 12 that the device agnostic message 18 had been received and would thus call or initiate further subroutines or operations in the first application 12 which would result in creation of further messages 16. Of course, those of skill would understand the present invention could use the same system and method to create messages 26 by the second application 14 which using the same device agnostic message format 18, would be processed and recognized by the first application and cause the creation of a callback 30 to the second application 14. Additionally, those of ordinary skill would understand that the framework of the present invention could be used to combine the callback 30 and create messages 26 steps to practice an embodiment within the scope of the present invention.

A second embodiment of the present invention is shown in FIG. 2, which addresses a situation in which there exists a need for communication between a web application on a first hardware device and a native computer application on a second hardware device. For instance, a user may desire the ability to have a web browser application on a first device interface with a native application (e.g., a so-called smart board application) which uses separate hardware. For example, the user may have access to a web browser displaying a web application depicting a globe and offering web tools for drawing upon the globe picture. In addition, the first computer device may have attached to it a smart board and smart board tools (e.g., a smart board pen) for marking upon the smart board. The present framework would enable the user to operate the smart board pen on the smart board to implement changes on the globe being depicted as if he or she were operating the software web tools on the web application. In the system 100 of this second embodiment, the first computing device 110 has a first application 112 (e.g., a browser) which creates a message 114 intended for a second application 122 on a second device 120. As with the first embodiment, this framework involves the first application 112 creating a message 114. The message 114 is used to provide the data 134 for a device agnostic message 130, which further includes at least a unique identifier or ID 132 and an address 136 for the second computing device 120, e.g., the IP internet address. As with the first embodiment, upon receipt of the device agnostic message 130, the second application 122 generates a callback 124 which is sent back to the first computer application. Also as with the first embodiment, the device agnostic message framework of this embodiment may be used to create messages 126 by the second application, such message 126 being sent to the first application 112 which in turn generate a callback 116 from the first application 112 to the second application 122.

FIG. 3 disclosed a variant of the second preferred embodiment which is identical to that disclosed in FIG. 2 except for the additional requirement within the composition of the device agnostic message. Specifically, in this variant of the present invention, the device agnostic message 130 further includes an intent component 138 for enabling a specific command which directs a certain action to be taken by the recipient second computer device 120. For example, the instruction may be from a first application 112 to a second computer device 120 instructing the device (or an application on the device) to turn on. In this embodiment the intent acts like an address for number of recipients or listeners listening for a specific type of message, and the messages are instructions are the ones which directs certain actions. Thus, for example, a single first application, e.g., a web application, on a first device could provide communications and instructions with a number of remote computers identifying a meeting for a particular group on a given date. In such an event, the communications could be received and processed by one or more remote computers which would act upon such communications so long as they are members of the group, and further so long as the software application recognizes the message, e.g., a calendaring application might record the date of the meeting in response to the message, but a presentation application might not recognize the message, and thus would ignore it.

Figure 4:
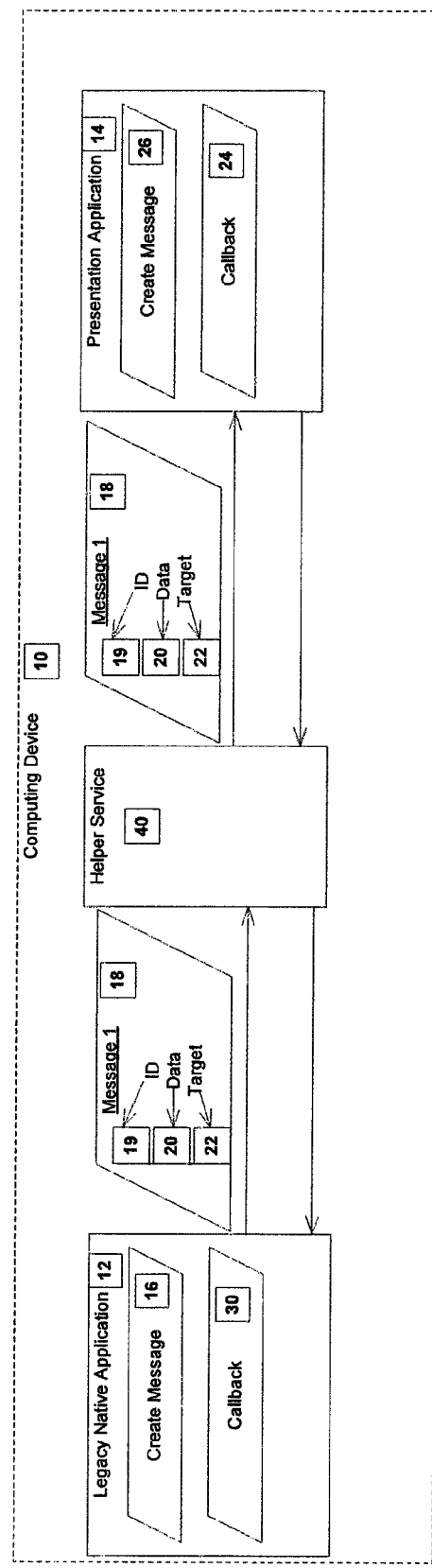
FIG. 4 shows a further example of the first preferred embodiment of the device connectivity framework operating between to applications on the same computing device.
Figure 5:
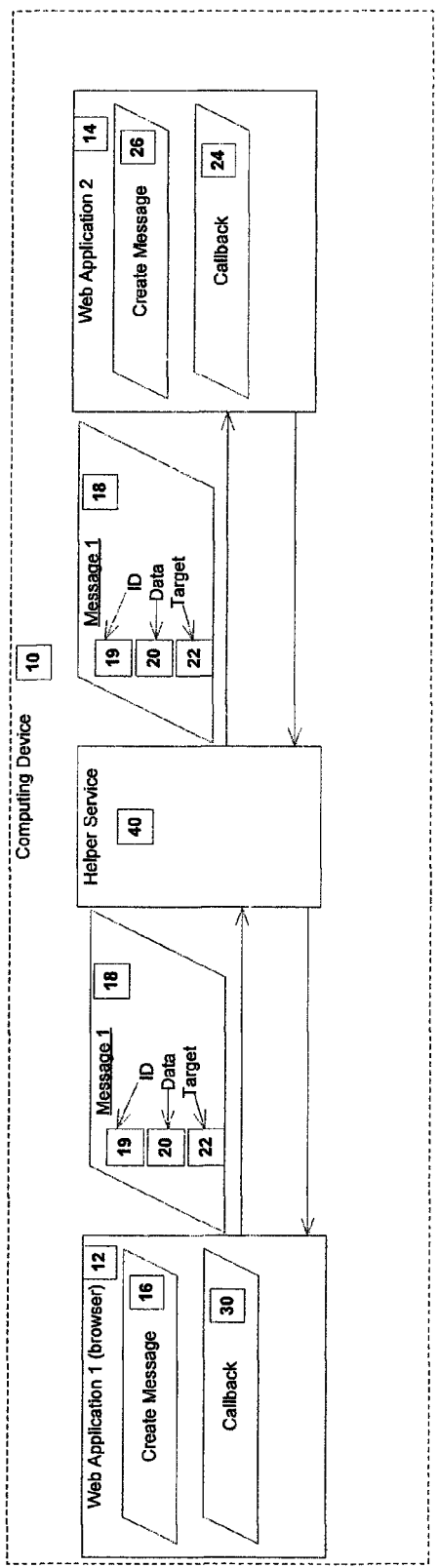
FIG. 5 shows still a further example of the first preferred embodiment of the device connectivity framework enabling communications between two web applications on the same computing device.

As shown in FIGS. 4 and 5, examples of the first 12 and second 14 applications may be, respectively, a large native application, and a presentation application, or a web application (browser) 12 and a second web application 14. The specific choices of applications are not material to the scope of present invention, except that the first application 12 and second application do not have to use the same language or have the same instruction set to operate, and the functionality of the present invention requires some level of communication between the first and second applications such that the interaction between the two is to the benefit of the user and/or the application providers. In the example of FIG. 4, the first embodiment may be employed, for example, where the user desires to have his or her first application (a large native application) provide rich content to a second application 14 which is a presentation application. In the example of FIG. 5, by contrast, both the first and second applications 12, 14 are web browser applications. In both of these examples, the system includes a helper service 40 which, in these examples, comprises a helper application install on the computing device. The functionality of this helper service would be present in FIG. 1, but would be provided, for example, by the addition of software code into the first and second applications. The embodiments of FIGS. 4 and 5, by comparison, are particularly useful where, for example, the proprietary nature of the software makes the integration of the helper service 40 into the code of the first application 12 impractical. The function of the helper service 40 is to provide the mechanism for handling the device agnostic messages between the first and second applications. For example the HTML or AJAX code in the first application 12 communicates with an embedded shockwave flash file (.SWF)(not shown), and the helper file, in turn, communicates with local components, such as drivers to enable any control or actuation of the device which desired as a result of the communication between the first and second applications.

Figure 6:
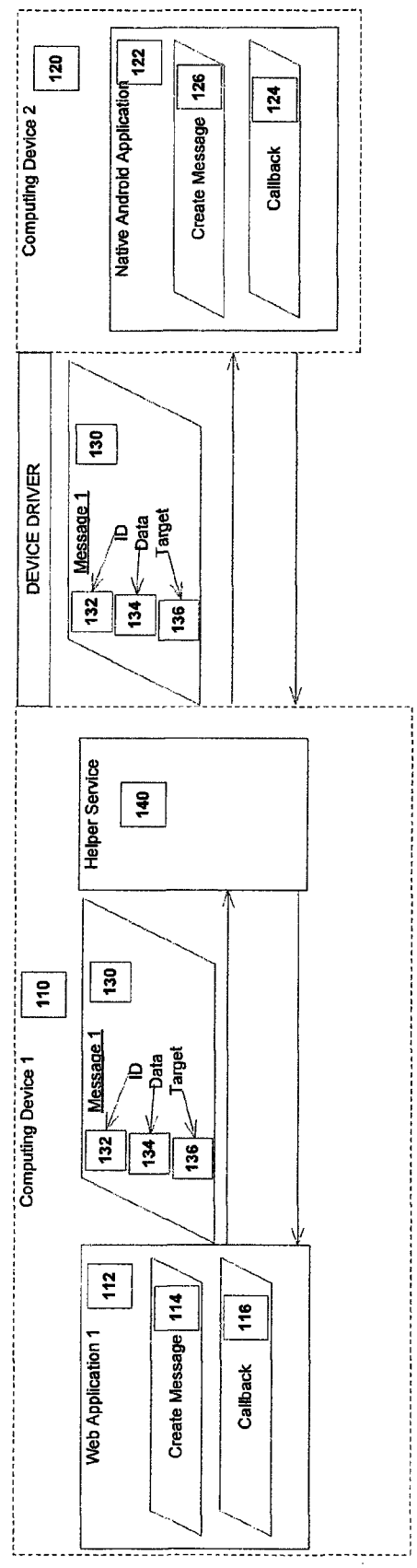
FIG. 6 shows an example of the second preferred embodiment of the device connectivity framework enabling communications between a web application on a first computing device and an Android application on a second, remote computing device.

The system 100 of FIGS. 6 and 7 are variants and examples of FIG. 2 showing an example of the present invention in communication between a first computing device 110 and a second computing device 120. The interface of this example is enabling by the helper service 140, which passes device agnostic messages 130 between the first and second computing devices. In this example, the first application creates a device agnostic message 130 whereby the first computing device start and searches the local network for another computing device which is enabled for the helper program 140. Once communication is established based upon a device agnostic message 130, the present system enables data objects to be passed seamlessly between the first application 112 and the second application 114 through TCP communications via sockets (not shown) thus enabling what appears to the user to be a multi-screen experience (e.g., the screen display and functionality of the second computing device 114 receives and displays the screen display of the first computing device 112).

In order to help those of skill in practicing the present invention, the following source code disclosure is provided. This code corresponds to the practice of the invention shown in FIG. 6. The sample of code constitutes of the following different components:

1. Helper Service 140 (which in this example is a Windows Service implemented using c#)
2. DCF SWF Library part of Web Application 112 (Flex library implemented using action script)
3. Web Application 112 (Built using HTML and JavaScript)
4. Android Native Application [122] (android apk package)

First, the following module illustrates the implementation of the Helper Service 140 using C#:

DCF Helper Service 140 Codebase

Service class which invokes the Listener class of the Helper Service
ListenerService Implementation

```
namespace RaVt.ListenerService
{
  partial class Service1 : ServiceBase
  {
    public Service1( )
    {
        //initializes the windows service component
        InitializeComponent( );
    }
    protected override void OnStart(string[ ] args)
    {
        //on start of the service
        //invokes the Listener initialize
        RaVt.Listener.Program.Initialize( );
    }
    protected override void OnStop( )
    {
        RaVt.Listener.Program.Close( );
    }
  }
}
```

Listener class which is responsible instatiating the DCF C# Library which is part of the Helper Service 140
Listener Module Implementation

```
namespace RaVt.Listener
{
  public class Program
  {
    static void Main(string[ ] args)
    {
        //invokes the initialize method of the listener class
        Initialize( );
    }
    // Initializes the Listener class
    public static void Initialize( )
    {
      // Execute all the startup commands
          //which are configured in a config.cs class
      CommandUtil.ExecuteCommands-
      (Config.START_UP_COMMANDS,
              Assembly.GetAssembly(typeof(Program)));
    }
  }
}
```

Listener Conifg Class Implementation

```
namespace RaVt.Listener
{
  public class Config
  {
    // The Listener DCF Port
    public const int DCF_PORT = 12365;
    public const int SERVICE_MANAGER_PORT = 12364;
    // Commands to execute on startup, which triggers the execute
method in the respective classes
    public static readonly Type[ ] START_UP_COMMANDS = {
typeof( OpenFirewallPortsCommand ),
                typeof( DCFStartupCommand ),
                typeof( StartMessageHandlersCommand ) };
    // Commands to execute on close
    public static readonly Type[ ] CLOSE_BRIDGE = { typeof(
DCFStopCommand ) };
    public static readonly Type[ ] STOP_COMMANDS = { typeof(
CloseFirewallPortsCommand )};
  }
}
```

The following classes are executed or invoked as part of the Helper Service 140 Startup.

The following class module is responsible for adding exception rules to the windows firewall for the specific port or ports:

Listener OpenFireWallPorts Class Implementation

```
namespace RaVt.Listener.Commands
{
  // Command class responsible for opening the required ports on all accessible Firewalls
  public class OpenFirewallPortsCommand : Command
  {
      //constants
    protected const string WIN_XP_ARGS = "firewall add portopening tcp 12365 \"Support Helper\"";
      protected const string WIN_VISTA_7_ARGS = "advfirewall firewall add rule name=\"Support Helper\" dir=in action=allow protocol=TCP localport=12365";
      protected const string NETSH = "netsh";
      // utility method to start a windows process in the background
      public static Process StartProcess( string cmd, string args, bool show, bool waitForExit )
      {
```

```
        ProcessStartInfo psi = new ProcessStartInfo( cmd, args );
        Process p = new Process( );
        if ( !show )
        {
            psi.CreateNoWindow = true;
            psi.UseShellExecute = false;
        }
        p.StartInfo = psi;
        p.Start( );
        if ( waitForExit )
            p.WaitForExit( );
        return p;
    }
//The execute method is invoked as part of the start up command //OpenFirewallPortsCommand parameter
    public void Execute( )
    {
        // Vista and Windows 7
        if ( Environment.OSVersion.Version.Major == 6 )
        {
            StartProcess( NETSH, WIN_VISTA_7_ARGS, false, false );
        }
        // Windows XP
        else if ( Environment.OSVersion.Version.Major == 5 )
        {
            StartProcess( NETSH, WIN_XP_ARGS, false, false );
        }
    }
  }
}
```

The following class is responsible for instantiating the DCF Policy server and opening the DCF Socket Connection Bridge which is part of DCF C# Library, all of which are components of the Helper service 140

```
namespace RaVt.Listener.Commands
{
//Command class responsible for setting up ConnectITDCF.
        //Starts a Cross Domain Policy server and then the
   ConnectITDCF bridge.
   public class DCFStartupCommand : Command
   {
        //Executes the functionality for setting up ConnectITDCF
      public void Execute( )
      {
         // Start the PolicyServer that responds to cross domain requests
         // Service Manager Port in this case is 12364
         PolicyServer.DEFAULT_PORT =
         Config.SERVICE_MANAGER_PORT;
         PolicyServer.Start( );
         // Setup the DCF Bridge and open the socket
         Bridge.PORT = Config.DCF_PORT;
         Bridge.Open( );
      }
   }
}
```

The following code implements the DCF C# Library part of Helper Service 140, which acts as a connection host for the Web Application 112.

DCF C# Library Implementation

PolicyServer Class Implementation

```
namespace DCF
{
  // Class PolicyServer
  // Starts a PolicyServer on the specified port.
  public class PolicyServer
  {
    // If no argument is passed the server will listen on this port for connections
    public static int DEFAULT_PORT = 12344;
    public static String[ ] DEFAULT_POLICY = new String[ ] { "*" };
    // The character sequence sent by the DCF Flash object or SWF to request a _policy file
    public const String POLICY_REQUEST = "<policy-file-request/>";
    // starts the policy server
// the server uses the port param to listen on for connections
    public static void Start( )
    {
      int port = DEFAULT_PORT;
      // new policy server is started
      PolicyServer server = new PolicyServer( port, new String[ ] { "*:80" } );
      new Thread( server.Run ).Start( );
    }
    // PolicyServer class local variables
    private int _port;
    private bool _listening;
    private Socket _socketServer;
    private static String _policy;
    // PolicyServer constructor
    // param port_   Sets the port that the PolicyServer listens on
    public PolicyServer( int port_, String[ ] allowedHosts_ )
    {
      _port = port_;
      _listening = true;
      if ( allowedHosts_ == null ) allowedHosts_ = DEFAULT_POLICY;
      _policy = buildPolicy( allowedHosts_ );
    }
// Constructs the cross domain policy string for the DCF Flash
//      object or SWF component
    private String buildPolicy( String[ ] allowedHosts_ )
    {
      StringBuilder policyBuffer = new StringBuilder( );
      policyBuffer.Append( "<?xml version=\"1.0\"?><cross-domain-policy>" );
      policyBuffer.Append( "<site-control permitted-cross-domain-policies=\"by-content-type\"/>" );
      for ( int i = 0; i < allowedHosts_.Length; i++ )
      {
        String[ ] hostInfo = allowedHosts_[ i ].Split( new char[ ] { ':' } );
        String hostname = hostInfo[ 0 ];
        String ports;
        if ( hostInfo.Length > 1 ) ports = hostInfo[ 1 ];
        else ports = "*";
// allows access from domains to the following port, which is
// which is 12365 for our DCF Socket Bridge
        policyBuffer.Append( "<allow-access-from domain=\"" + hostname + "\" to-ports=\"12365\" />" );
      }
      policyBuffer.Append( "</cross-domain-policy>" );
      return policyBuffer.ToString( );
    }
    // Thread run method, accepts incoming connections and creates SocketConnection objects
to handle requests
    public void Run( )
    {
      try
      {
        _listening = true;
        // Start listening for connections
        _socketServer = new Socket( AddressFamily.InterNetwork, SocketType.Stream,
              ProtocolType.Tcp );
        _socketServer.Bind( new IPEndPoint( IPAddress.Any, _port ) );
        // start listening...
        _socketServer.Listen( 4 );
        while ( _listening )
        {
          // Wait for a connection and accept it
          Socket socket = _socketServer.Accept( );
          try
          {
            // Start a new connection thread
            new Thread( new SocketConnection( socket ).Run ).Start( );
          }
          catch ( Exception e )
          {
```

```
            __logger.Error( "Exception: " + e.ToString( ) );
          }
          // Wait for a sec until a new connection is accepted to avoid flooding
          Thread.Sleep( 1000 );
        }
      }
      catch ( IOException e )
      {
        __logger.Error( "IO Exception: " + e.ToString( ) );
      }
    }
    // Local class SocketConnection
    For every accepted connection one SocketConnection is created.
     It waits for the _policy file request, returns the _policy file and closes the connection
immediately
    class SocketConnection
    {
      private Socket _socket;
      private StreamReader _socketIn;
      private StreamWriter _socketOut;
      // Constructor takes the Socket object for this connection
      @param socket_ Socket connection to a client created by the PolicyServer main thread
      public SocketConnection( Socket socket_ )
      {
        _socket = socket_;
      }
      // Thread run method waits for the _policy request, returns the poilcy file and closes the
connection
      public void Run( )
      {
        readPolicyRequest( );
      }
      // Wait for and read the _policy request sent by the Flash Player
      Return the _policy file and close the Socket connection
      private void readPolicyRequest( )
      {
        try
        {
          // Read the request and compare it to the request string defined in the constants.
          // If the proper _policy request has been sent write out the _policy file
          String readData = read( );
          if ( POLICY_REQUEST.Equals( readData ) ) Write( _policy );
        }
        catch ( Exception e )
        {
          if ( DEBUG ) System.Console.WriteLine( "PolicyServer.readPolicyRequest( ) " +
e.ToString( ) );
        }
        Close( );
      }
      // Read until a zero character is sent or a maximum of 100 character
      private String read( )
      {
        byte[ ] buffer = new byte[ _socket.ReceiveBufferSize ];
        _socket.Receive( buffer );
        StringBuilder strb = new StringBuilder( );
        foreach ( byte byt in buffer )
        {
          if ( byt == (byte)0 ) break;
          strb.Append( (char)byt );
        }
        return strb.ToString( );
      }
      // Writes a String to the client
      @param msg Text to be sent to the client (_policy file)
      public void Write( String msg )
      {
        msg += "\u0000";
        char[ ] chars = msg.ToCharArray( );
        byte[ ] buffer = new byte[ chars.Length ];
        int idx = 0;
        foreach ( char chr in chars )
        {
          buffer[ idx ] = (byte)chr;
          idx++;
        }
        _socket.Send( buffer );
      }
      // Close the Socket connection an set everything to null. Prepared for garbage collection
```

```
      public void Close( )
      {
        try
        {
          if ( _socket != null ) _socket.Close( );
          if ( _socketOut != null ) _socketOut.Close( );
          if ( _socketIn != null ) _socketIn.Close( );
        }
        catch ( IOException e ) { System.Console.WriteLine( e ); }
        _socketIn = null;
        _socketOut = null;
        _socket = null;
      }
    }
  }
}
```

The following code implements the DCF Socket Connection Bridge in DCF C# Library which is part of the Helper Service 140.

Bridge Class Implementation

```
namespace DCF
{
  // The Bridge class is a singleton gateway to the Flex DCF bridge.
  // IMessages are exchanged between this C# bridge object and the Flex bridge object.
  // @see DCF.events.DCFEvent
  // @see DCF.Messages.IMessage;
  public class Bridge
  {
        // Class Constant
        public const String CONFIG_PATH    = "./config/DCF-native-config.xml";
        public const String READER_STRING  = "reader";
        public const String WRITER_STRING  = "writer";
        public const String PORT_STRING    = "port";
        // The port used to connect DCF Bridge which is configured from Helper Service
        public static int PORT    = 12365;
        // The single instance of the DCF Bridge
    public static Bridge GetInstance( )
    {
        if ( Instance == null )
        {
                Instance = new Bridge( );
                // Registers the Message handlers which are message Types
                Instance.RegisterHandlers( );
        }
      return Instance;
    }
    // Opens the DCF server socket, which is invoked from Helper Service
    public static void Open( )
    {
        if ( Thread == null )
        {
                Bridge.Thread           = new Thread( Bridge.GetInstance( ).Run );
                Bridge.Thread.Start( );
                Bridge.IsRunning        = true;
        }
    }
    // Closes the DCF server socket which is invoked from the Helper Service
    public static void Close( )
    {
        Bridge.IsRunning        = false;
        Bridge.Thread           = null;
        try
        {
        Instance._server.Close( );
        }
        catch ( IOException exception )
        {
                _logger.Error( exception );
        }
    }
        // Local Class Variables
    private static Bridge   Instance    = null;
    private static Thread   Thread      = null;
    private static bool     IsRunning   = true;
```

```
// Bridge class Constructor
private Bridge( )
{
    ReadConfig( );
    __handlers = new Dictionary<String, List<IMessageHandler>>( );
}
// The run method of the thread
    public void Run( )
    {
        try
        {
            __server = new Socket( AddressFamily.InterNetwork, SocketType.Stream,
                ProtocolType.Tcp );
            __server.Bind( new IPEndPoint( IPAddress.Any, PORT ) );
            __server.Listen( 4 );
                while( true )
                {
                    // Get the first client that connects
                    Socket temp = __server.Accept( );
                    __client = temp;
                    // Instantiate a listener thread that will listen and read the input stream
                    // of the first client that connects and start the thread
                    __clientListenerThread = new BridgeListenerThread( _client, __reader );
            new Thread( __clientListenerThread.Run ).Start( );
                }
        }
        catch ( Exception e )
        {
            __logger.Error( e );
        }
    }
    // Dispatches an IMessage to registered listeners.
    public void DispatchMessage( IMessage message )
    {
List<IMessageHandler> list = null;
        // Get the list of handlers registered for the event type
if ( __handlers.ContainsKey(message.type) == false )
{
    return;
}
else
{
    list = __handlers[message.type];
    if ((list != null) && (list.Count > 0))
    {
       foreach (IMessageHandler handler in list)
       {
           handler.HandleMessage(message);
       }
    }
}
    }
    // Registers an IMessageHandler to receive notifications when a certain message type
is dispatched. These Message Types acts a target.
        public void RegisterMessageHandler( String type, IMessageHandler handler )
        {
            // Get the list of handlers registered for the event type
List<IMessageHandler> list = null;
if ( __handlers.ContainsKey( type ) )
{
    list = __handlers[ type ];
}
else
{
    // If the list is null, create a new list to add 'handler' to
        list = new List<IMessageHandler>( );
        __handlers.Add( type, list );
}
// Add the handler to the list
list.Add( handler );
        }
// Sends a message to the DCF Flex Object or SWF component side of the DCF bridge.
    public void SendMessage( IMessage message )
{
        if ( __client == null || __client.Connected == false ) return;
        byte[ ] bytes = __writer.write( message );
```

```
    // Send the length of the message first
    byte[ ] lenBytes = new byte[4];
    lenBytes[0] = (byte)(bytes.Length >> 24);
    lenBytes[1] = (byte)(bytes.Length >> 16);
    lenBytes[2] = (byte)(bytes.Length >> 8);
    lenBytes[3] = (byte)bytes.Length;
    //send the header
    __client.Send(lenBytes);
    // Send the message
    __client.Send(bytes);
    }
    // Unregisters a given handler.
    public void UnRegisterMessageHandler( String type, IMessageHandler handler )
    {
    IMessageHandler localHandler = null;
    // Get the list of handlers registered for the event type
    List<IMessageHandler> list = __handlers[type];
    // If the list is not null and not empty, look for handler in the list and remove it if a match
is found
        if (list != null && list.Count > 0)
        {
           foreach (IMessageHandler activeHandler in list)
           {
             if (activeHandler == handler)
             {
                localHandler = handler;
             }
           }
           list.Remove(localHandler);
        }
    }
    // Instantiates the framework IMessageHandlers
    protected void RegisterHandlers( )
    {
        // Registers SystemExecuteHandler as the IMessageHandler of the
        // SystemExecuteMessage.SYSTEM_EXECUTE message type.
          new SystemExecuteMessageHandler( );
    }
    // The socket that open connections to the Flex DCF bridge.
    private Socket                      __server                 = null;
    // The socket that connected to the Flex DCF bridge.
    private Socket                                 __client
    = null;
    // The thread that listens for messages from the Flex client socket.
    private BridgeListenerThread     __clientListenerThread = null;
    // The IWriter used to serialize data sent across the bridge to Flex.
    private IWriter                     __writer                 = new
AMF3Writer( );
    // The IReader used to deserialize data that comes across the bridge from Flex.
    private IReader                     __reader                 = new
AMF3Reader( );
    // A Dictionary of registered event handlers.
    private Dictionary<String, List<IMessageHandler>> __handlers = null;
    }
}
```

The following code implements the BridgeListenerThread 50 class which is responsible for reading the Message 130 from Web Application 112 and notifying the DCF C# Library Bridge which is part of the Helper Service 140.
BridgeListenerThread Class Implementation

```
namespace DCF
{
    // The BridgeListenerThread listens for messages from a client socket and notifies the bridge
when a message is received.
        public class BridgeListenerThread
        {
    // Constructor.
        public BridgeListenerThread( Socket client, IReader reader ) : base( )
        {
                    __client              = client;
                    __reader              = reader;
        }
        // The run method of the thread that reads data from the input stream. When a
```

-continued messaged is deserialized it is broadcasted from the bridge via Bridge.dispatchEvent. Registered listeners are notified of the event.

```
            public void Run( )
{
    byte[ ] bytes = null;
    bool firstRead = true;
    List<IMessage> messages = null;
                // When the first byte returns is equal to −1, the socket has been
                  disconnected
                // we let the thread end at this point.
    while ( firstRead == true || ( bytes != null && bytes.Length > 0 &&
          bytes[ 0 ] != Int32.Parse( "−1 " ) ) )
            {
        firstRead = false;
        while ( ___client.Available == 0 )
        {
            Thread.Sleep( 500 );
        }
        ___logger.Debug( ___client.Available + " bytes recv'd." );
        try
                {
            bytes = new byte[ ___client.Available ];
            ___client.Receive( bytes );
            byte firstByte = bytes[0];
                    // check to see if message is AMF or JSON
            if (firstByte != Int32.Parse("10"))
            {
                ___logger.Debug("Message is not an AMF object");
                messages = jsonRead(bytes);
            }
            else
            {
                messages = ___reader.read(bytes);
            }
            if ( bytes != null && bytes.Length > 0 )
            {
                ___logger.Debug( "First byte: " + bytes[ 0 ] );
            }
            if ( messages != null && messages.Count > 0 )
            {
                foreach ( IMessage message in messages )
                {
                    // Broadcast the Message from the Bridge
                    Bridge.GetInstance( ).DispatchMessage( message );
                }
            }
            else
            {
                bytes = null;
            }
                }
                catch ( Exception exception )
                {
            bytes = null;
                }
            }
}
public List<IMessage> jsonRead(byte[ ] bytes)
{
    MemoryStream ms = new MemoryStream( );
    foreach (byte b in bytes)
    {
        ms.WriteByte(b);
    }
    ms.Position = 0;
    StreamReader sr = new StreamReader(ms);
    string msgstr = sr.ReadToEnd( );
    Console.WriteLine(msgstr);
    IMessage message = null;
    List<IMessage> messages = new List<IMessage>( );
    Dictionary<string, object> objdata = DeserializeJSON(msgstr);
    Console.WriteLine("Message Type:" + objdata["type"].ToString( ));
    Message m = new Message( );
    m.type = objdata["type"].ToString( );
    m.data = objdata["data"];
    m.uid = objdata["uid"].ToString( );
    message = m;
    messages.Add(message);
    return messages;
```

```
}
#region JSON utility Methods
public Dictionary<string, object> DeserializeJSON(string json)
{
    var d = new Dictionary<string, object>( );
    if (json.StartsWith("{"))
    {
        json = json.Remove(0, 1);
        if (json.EndsWith("}"))
            json = json.Substring(0, json.Length − 1);
    }
    json.Trim( );
    // Parse out Object Properties from JSON
    while (json.Length > 0)
    {
        var beginProp = json.Substring(0, json.IndexOf(':'));
        json = json.Substring(beginProp.Length);
        var indexOfComma = json.IndexOf(',');
        string endProp;
        if (indexOfComma > −1)
        {
            endProp = json.Substring(0, indexOfComma);
            json = json.Substring(endProp.Length);
        }
        else
        {
            endProp = json;
            json = string.Empty;
        }
        var curlyIndex = endProp.IndexOf('{');
        if (curlyIndex > −1)
        {
            var curlyCount = 1;
            while (endProp.Substring(curlyIndex + 1).IndexOf("{") > −1)
            {
                curlyCount++;
                curlyIndex = endProp.Substring(curlyIndex + 1).IndexOf("{");
            }
            while (curlyCount > 0)
            {
                endProp += json.Substring(0, json.IndexOf('}') + 1);
                json = json.Remove(0, json.IndexOf('}') + 1);
                curlyCount−−;
            }
        }
        json = json.Trim( );
        if (json.StartsWith(","))
            json = json.Remove(0, 1);
        json.Trim( );
        // Individual Property (Name/Value Pair) Is Isolated
        var s = (beginProp + endProp).Trim( );
        // Now parse the name/value pair out and put into Dictionary
        var name = s.Substring(0, s.IndexOf(":")).Trim( );
        var value = s.Substring(name.Length + 1).Trim( );
        if (name.StartsWith("\"") && name.EndsWith("\""))
        {
            name = name.Substring(1, name.Length − 2);
        }
        double valueNumberCheck;
        if (value.StartsWith("\"") && value.StartsWith("\""))
        {
            // String Value
            d.Add(name, value.Substring(1, value.Length − 2));
        }
        else if (value.StartsWith("{") && value.EndsWith("}"))
        {
            // JSON Value
            d.Add(name, DeserializeJSON(value));
        }
        else if (double.TryParse(value, out valueNumberCheck))
        {
            // Numeric Value
            d.Add(name, valueNumberCheck);
        }
        else
            d.Add(name, value);
    }
    return d;
}
```

```
#endregion JSON utility Methods
        // The client connected from the UI side of the bridge.
        private Socket                    __client = null;
        // The reader used to deserialize Objects sent across the bridge.
        private IReader                   __reader = null;
    }
}
```

The following code Implements the SystemExecuteMessageHandler and SystemExecuteMessage class which acts as a utility to execute any system process from the Web Application 112.

SystemExecuteMessage Handler Class Implementation

```
namespace DCF.systemexecute.handlers
{
    public class SystemExecuteMessageHandler : MessageHandler
    {
        // The default constructor
        public SystemExecuteMessageHandler( )
            : base( SystemExecuteMessage.SYSTEM_EXECUTE )
        {
        }
        // Handles an IMessage dispatched from the Bridge.
        public void handleMessage( IMessage message )
        {
            if ( message is SystemExecuteMessage )
            {
                SystemExecuteMessage sem = (SystemExecuteMessage)message;
                // Use the args passed in the message to do a shell exec
                try
                {
                    string[ ] args = sem.args;
                    if ( args.Length > 1 )
                    {
                        __logger.Debug( "Executing " + args[ 0 ] + " " + args[ 1 ] + "." );
                        System.Diagnostics.Process.Start( args[ 0 ], args[ 1 ] );
                    }
                    else if ( args.Length == 1 )
                    {
                        __logger.Debug( "Executing " + args[ 0 ] + "." );
                        System.Diagnostics.Process.Start( args[ 0 ] );
                    }
                }
                catch ( Exception e )
                {
                    __logger.Error( e );
                }
            }
        }
    }
}
```

SystemExecuteMessage Class Implementation

```
namespace DCF.systemexecute.messages
{
    // The SystemExecuteMessage class is a sub class of Message that
    signals a system execute request from the UI layer.
    public class SystemExecuteMessage : Message
    {
        // Message type for a system execute command.
        public const string SYSTEM_EXECUTE = "systemExecute";
        // Constructor.
        public SystemExecuteMessage( ) : base( )
        {
        }
        // A set of args to use as the system execute parameters
        public string[ ] args
        {
            get
            {
                Object[ ] data = (Object[ ])base.data;
                String[ ] args = new String[ data.Length ];
                for ( int i = 0; i < data.Length; i++ )
                {
                    args[ i ] = (String)data[ i ];
                }
                return args:
            }
        }
    }
}
```

The following code implements the MessageHandler class and IMessageHandler interface of the DCF C# Library which is part of the Helper Service 140.

IMessage Handler Interface Implementation

```
namespace DCF.Handlers
{
    // The IMessageHandler interface defines the methods for receiving a
        Message from the Bridge.
    public interface IMessageHandler
    {
        // Handles an IMessage dispatched from the Bridge.
        void HandleMessage( IMessage message );
        // Removes all types being listened for by this IMessageHandler
        void UnregisterAllTypes( );
    }
}
```

Message Handler Class Implementation

```
namespace DCF.Handlers
{
    public class MessageHandler : IMessageHandler
    {
        // The default constructor
        public MessageHandler( )
        {
        }
        // Automatically registers the handler for message type.
        public MessageHandler( String type )
        {
            AddMessageType( type );
        }
        // Handles an IMessage dispatched from the Bridge.
        public virtual void HandleMessage( IMessage message )
        {
        }
        // Removes all of the type messages registered, cleaning up
anyexternal references held by the Bridge to this Handler
        public virtual void UnregisterAllTypes( )
        {
            String[ ] types = Types.ToArray( );
            foreach ( String type in types )
            {
                RemoveMessageType( type );
            }
        }
        // Adds another message type to be listend for by this instance of
        MessageHandler.
        public void AddMessageType( String type )
        {
            Types.Add( type );
            Bridge.GetInstance( ).RegisterMessageHandler( type, this );
        }
        // Removes the handling of message type.
        public void RemoveMessageType( String type )
        {
            Types.Remove( type );
            Bridge.GetInstance( ).UnRegisterMessageHandler( type,
                this );
        }
        // The types this handler is registered to listen for
        protected List<string> Types = new List<string>( );
    }
}
```

The following code implements the IMessage interface and Message class which are of type Message 130.

IMessage Interface Implementation

```
namespace DCF.messages
{
    // The IMessage interface describes a 'message' sent from the DCF
        Flex bridge.
    public interface IMessage
    {
        // The message type.
        String type
        {
            get;
            set;
        }
        // The data of the message.
        Object data
        {
            get;
            set;
        }
    }
}
```

Message Class Implementation

```
namespace DCF.messages
{
    // The Message class implements IMessage, a 'message' sent from
        the DCF Flex bridge.
    public class Message : IMessage
    {
        // Convience method to check if a message matches a type.
        public static bool IsType( IMessage message, string type )
        {
            return type.Equals( message.type );
        }
        // Constructor.
        public Message( )
        {
            this.uid = System.Guid.NewGuid( ).ToString( );
        }
        // Constructor.
        public Message( String type )
            : this( )
        {
            this.type = type;
        }
        // Constructor.
        public Message( String type, Object data )
            : this( type )
        {
            this.data = data;
        }
        // The type of the message.
        public String type
        {
            get { return ___type; }
            set { ___type = value; }
        }
        // A unique ID for this message.
        public String uid
        {
            get { return ___uid; }
            set { ___uid = value; }
        }
        // The data carried by this message.
        public Object data
        {
            get { return ___data; }
            set { ___data = value; }
        }
        // Sends this message across the bridge.
        public void send( )
        {
            try
            {
                Bridge.GetInstance( ).SendMessage( this );
            }
            catch ( Exception e )
            {
                ___logger.Error( e );
            }
        }
        // Used by the getters/setters.
        private String ___type = null;
```

```
        private String ___uid = null;
        private Object ___data = null;
    }
}
```

With the above code implementing the DCF C# Library which acts as Host Bridge, which is part of the Helper Service 140, the present embodiment involving continuing to implement the rest of the start up commands from the Listener initialization.

Continuation of the Listener Startup Commands

```
            }
        }
    }
}
```

The above code instantiates all the message handlers, which are configured as part of the Listener class of the Helper Service 140.

The following code implements the ListenerMessageHandler type which is part of the Listener class and registers all the Message Types that are supported by the Listener which is part of the Helper Service 140.

ListenerMessageHandlers Class Implementation

```
namespace RaVt.Listener.Handlers
{
    // Handles ListenerMessages
    class ListenerMessageHandler : MessageHandler
    {
        // The default constructor adds the ListenerMessage types handled
          by ListenerMessageHandler
        public ListenerMessageHandler( )
        {
            AddMessageType(START_ON_DEMAND );
            AddMessageType(STOP_ON_DEMAND);
        }
    // The entry point for ListenerMessages recieved from the web ui,
    // will be handled in this override methos
        public override void HandleMessage( IMessage message )
        {
            if ( message.type.Equals( ListenerMessage.START_ON_DEMAND ) )
            {
                // Handles the start on demand meesage type from web ui
                HandleStartOnDemand(message);
            }
            else if (message.type.Equals(ListenerMessage.STOP_ON_DEMAND))
            {
                HandleStopOnDemand(message);
            }
        }
    }
}
```

The following code implements the StartMessageHandlersCommands class part of Helper Service 140, which instantiates all the message handler types for Listener class.

StartMessageHandlers Class Implementation

```
namespace RaVt.Listener.Commands
{
    // Command class responsible for starting the required
      MessageHandlers.
    public class StartMessageHandlersCommand : Command
    {
        // The MessageHanders to start
        public static readonly Type[ ] MESSAGE_HANDLERS = {
typeof( ListenerMessageHandler ) };
        // Executes the functionality for instantiating the all the Handler
          Types
        public void Execute( )
        {
            // Instantiate each handler in the MESSAGE_HANDLERS
              array
            Assembly assembly = Assembly.GetAssembly(
              this.GetType( ) );
            if ( MESSAGE_HANDLERS != null &&
              MESSAGE_HANDLERS.Length > 0 )
            {
                foreach ( Type type in MESSAGE_HANDLERS )
                {
                    assembly.CreateInstance( type.FullName );
                }
```

The above code handles any Message 130 of the added types, that DCF C# Library reads from the Web Application 112.

The above code thus implements the Helper Service 140 part of the code, which acts a like a host to the Web Application 112 client in order to communicate to the external android device 120. What follows is an example of the Client side portion of the code. With the Helper Service 140 windows service running on the first computing device 110, a user can start a browser based Web Application 112 which constitutes the following HTML object code to instantiate the DCF Flex Library which is part of the Web Application 112 client.

```
<object id="Listener" classid="clsid:D27CDB6E-AE6D-11cf-96B8-444553540000"
        width="0" height="0"
        codebase="http://fpdownload.macromedia.com/get/flashplayer/current/swflash.cab">
    <param name="movie" value="@Url.Content("~/swf/dcf.swf")" />
    <param name="allowScriptAccess" value="always" />
    <embed src="@Url.Content("~/swf/dcf.swf")" quality="high" bgcolor="#869ca7"
        width="0" height="0" name="Listener" align="middle"
        play="true"
        loop="false"
        allowScriptAccess="always"
        type="application/x-shockwave-flash"
        pluginspage="http://www.adobe.com/go/getflashplayer">
    </embed>
</object>
// The javascript stores the listener dom element in a global variable called bridge
<script type="text/javascript">
    var bridge = document['Listener'];
// The following javascript method tries to establish a connection with the DCF Listener service.
function connectToListener( ) {
        var listenerCallback = function (message) {
            if (message.type == CONNECT_FAILURE_ERROR) {
                    // handles the connection failure
            }
            else if (message.type == CONNECT_SUCCESS) {
                // handles the connection success
            }
        }
        // registers the Listener Message Types for the client side
        registerListenerMessageTypes(listenerCallback);
        //call to connect to the DCF Flex bridge
        connectRADCF( );
    }
</script>
```

The following code implements the javascript methods to connect to DCF Flex bridge which is part of the HTML application DOM in the Web Application 112, using action script external interface.

The following code implements the Message 130 JavaScript object prototype for the Web Application 112 Client.

Message Prototype Implementation

```
// The Message class is a 'message' sent or received by the DCF UI layer.
    function Message(type, data) {
        // Properties
        this.type = type;
        this.data = data;
    }
// The Message Prototype properties.
    var uid;
    var type;
    var data;
    // Sends the message across the DCF bridge.
    Message.prototype.send = function( )
    {
        bridge.sendMessage( this );
    }
```

The following code implements the JavaScript MessageHandler object prototype to add, remove and handle Message 130 from the external android device 120 through the Helper Service 140 using the DCF Bridge.

MessageHandler Prototype Implementation

```
// The MessageHandler class defines the methods for receiving a Message from the Bridge.
        function MessageHandler( )
        {
        }
        // Handles a message dispatched from the Bridge. This method should be overridden by
MessageHandler sub class definitions / instances.
        MessageHandler.prototype.handleMessage = function(message) {
        }
        // adds message types to the DCF Flex Bridge instance for Particular handler type
        MessageHandler.prototype.addMessageType = function(type) {
                // Registers the type w/ the bridge. If the type has
                // been registered, it is ignored on the action script Flex library
                bridge.registerMessageHandler(type);
                // If this is the first handler registered for the type,
                // create an Array to store the handlers in the map
                if (handlersMap[type] == null) {
                   handlersMap[type] = new Array( );
                }
                // Map the message type to the respective handler types
                handlersMap[type].push(this);
        }
        // Removes the handling of message type
        MessageHandler.prototype.removeMessageType = function( type )
        {
                // true if there is another listener still listening to
                // this message type
                var stillListening = false;
                // The list of handlers registered for Message type
                var list = handlersMap[ type ];
                if ( list != null )
                {
                        // Find the handler in list that matches this
                        // instance and remove it
                        for ( i=0; i<list.length; i++ )
                        {
                                // if list[ i ] matches this listener, remove it
                                if ( list[ i ] == this )
                                {
                                        list[ i ] = null;
                                }
                                // if list[ i ] is not null, then there are still
                                // handlers listening to this type
                                else if ( list[ i ] != null )
                                {
                                        stillListening = true;
                                }
                        }
                }
        //first we need to pop the type from array and then unregister
        handlersMap[type].splice(handlersMap[type].indexOf(this), 1);
        bridge.unRegisterMessageHandler(type);
                // if there are still handlers listening to the type,
                // don't unRegister with DCF Flex library otherwise if all handlers
                // for this type are removed, then we can unregister the
                // type from the bridge
                if ( stillListening == false )
                {
                        bridge.unRegisterMessageHandler( type );
                }
        }
```

The following code implements the JavaScript methods to
initiate the socket connection from the Web Application 112
using the DCF Flex Library's external interface modules.

```
// connects the DCF client/ui Bridge to the DCF Flex Bridge.
function connectRADCF( port, host )
{
    try {
            // forcing the port to 12365, because the Helper Service Bridge is listening on that port
            bridge.connectDCF("12365", host);
    }
    catch (ex) {
    }
}
// disconnects the DCF client/ui Bridge to the native Bridge.
function disconnectRADCF( )
```

-continued
```
{
          bridge.disconnectDCF( );
}
// Performs a systemExecute via a proxy call to the DCF Flex Library.
// args are passed in as array of params
function systemExecute( args ) {
          bridge.systemExecute( args );
}
// The external callback for any messages that have a type that was registered, for any type that
has been registered. The list of handlers that have registered is looked up in handlersMap and
handleMessage( ) is called on each registered handler.
function handleDCFMessage(message) {
          // The list of handlers registered for messsage.type
          var list = handlersMap[ message.type ];
          // If the list is null there's nothing to do
          if ( list != null )
          {
              // Call handleMessage( ) on each handler registered
              // for message.type
              for( i=0; i<list.length; i++ )
              {
                  if ( list[ i ] != null )
                  {
                      list[ i ].handleMessage( message );
                  }
              }
          }
}
// Maps registered message types to a list of the associated handlers registered for the type.
var handlersMap = new Object( );
// DCF Constants
// Event type for a serialization error.
var SERIALIZE_ERROR = "serializeError";
// Event type for a deserialization error.
var DESERIALIZE_ERROR = "deserializeError";
// Event type for a connect failure error.
var CONNECT_FAILURE_ERROR = "connectFailureError";
// Event type for an initialization error.
var INITIALIZATION_ERROR = "initializationError";
var CONNECT_SUCCESS = "connectSuccess";
In order to handle the Message 130 types for connect success and the connect failure statuses
between first Web Application 112 and Helper Service 140, we have to register a
MessageHandler with above types. The following javascript registers the listener message types
by invoking the javascript method titled "registerListenerMessageTypes( )":
function registerListenerMessageTypes( ) {
    try {
          // creates a new messagehandler to store these message types
        var connectHandler = new MessageHandler( );
        connectHandler.addMessageType(CONNECT_FAILURE_ERROR);
        connectHandler.addMessageType(CONNECT_SUCCESS);
          // Maps the handleMessage to the callback of this method
          // when the DCF Flex bridge triggers the handleDCFMessage(message) through external
the following handler will get triggered
        connectHandler.handleMessage = handleStatus( );
        }
    catch (e) {
        console.log("Error in register listener: " + e);
    }
}
```

The following code illustrates the implementation of the DCF Flex Library which is located as part of Web Application 112 using actionscript.
The following code implements the ConnectDCF function part of the DCF Flex Library.
ConnectDCF Function Implementation

```
package
{
import DCF.Bridge;
// connects the DCF client/ui Bridge to the native Bridge.
public function connectDCF( port : int = -1, host : String = null ) : void
{
```

-continued
```
    if ( port == 0 ) port = -1;
    Bridge.connect( port, host );
}
}
```

The following code implements the Bridge class part of the DCF Flex Library which is located as part of Web Application 112. The Bridge class implementation is responsible for establishing a socket connection from DCF Flex Bridge (client) part of Web Application 112 to DCF C# Bridge (Host) part of the Helper Service 140.
Bridge Class Implementation

```
package DCF
{ import flash.events.Event;
import flash.events.IOErrorEvent;
import flash.events.ProgressEvent;
import flash.events.SecurityErrorEvent;
import flash.net.Socket;
import flash.net.URLLoader;
import flash.net.URLRequest;
import flash.utils.ByteArray;
import flash.utils.Dictionary;
import flash.utils.getDefinitionByName;

import merapi.connect.ConnectMessage;
import merapi.error.MerapiErrorMessage;
import merapi.handlers.IMessageHandler;
import merapi.io.amf.AMF3Reader;
import merapi.io.amf.AMF3Writer;
import merapi.io.reader.IReader;
import merapi.io.writer.IWriter;
import merapi.messages.IMessage;
import merapi.messages.Message;

import mx.rpc.IResonder;

// The Bridge class is a singleton gateway to the native DCF bridge. IMessages are exchanged
// between this client/ui Bridge instance and the native DCF
public class Bridge
{
  // String literals private static const AUTO_CONNECT_STR : String = "autoConnect";

private static const CLOSING : String = "closing";

private static const EMPTY : String = " ";

private static const HOSTNAME : String = "hostname";

private static const PORT_STR : String = "port";

private static const READER : String = "reader";

private static const TRUE : String = "true";

private static const UID : String = "uid";

private static const WRITER : String = "writer";

// Static properties

// PORT
  // port used to connect DCF which can be configured via dcf-client-config.xml
  public static var PORT : int = 12345;

// HOST
  // The host used to connect DCF which can be configured via dcf-client-config.xml
  public static var HOST : String = "127.0.0.1";

// READER_CLASS
  // The IReader class to use for serialization
  public static var READER_CLASS : Class = AMF3Reader;

// WRITER_CLASS
  // The IWriter class to use for deserialization
  public static var WRITER_CLASS : Class = AMF3Writer;

// CONFIG_PATH
  // The path to the DCF config xml
  public static var CONFIG_PATH : String = "config/dcf-client-config.xml";

// AUTO_CONNECT
  // If true, the bridge will automatically connect on the first reference of the instance.
Bridge. connect( ) or the top level function connectDCF may be invoked before the first reference
of instance. In this case, AUTO_CONNECT is ignored. The default value is true.
  public static var AUTO_CONNECT : Boolean = true;

// CONNECTED
  public static function get CONNECTED( ) : Boolean
```

```
{
  return_instance != null && _instance._client != null && _instance._client.connected ==true;
}

// Static methods
// Static code block that loads the DCF config
{
  readConfig( );
}

// The singleton instance of Bridge.
public f;tatic function getInstance( ) : Bridge
{
  if ( _instance == null )
  {
    _instance = new Bridge( new Bridge_SingletonBlocker );
  }
  return instance;
}

// Connects the DCF Bridge. (If the Bridge is not connected.)
public static function connect( port : int=-1, host : String=null ) : void
{
  if ( Bridge.CONNECTED == false )
  {
    if ( port == -1 )
      port = PORT;
    if( host == null )
      host = HOST;

if ( _instance._client != null )
    {
      _instance._client.removeEventListener( IOErrorEvent.IO_ERROR, _instance.handleIOError );
    } try
    {
      _instance._client = new Socket( host, port );
      _instance._client. addEventListener( IOErrorEvent.IO_ERROR, _instance.handleIOError );

_instance._client.addEventListener( SecurityErrorEvent.SECURITY_ERROR, _instance.handleIOError );

_instance._client.addEventListener( ProgressEvent.SOCKET_DATA, _instance.handleReceiveSocketData );

_instance._client.addEventListener( Event.CONNECT, function( e : Event ) : void { _instance.dispatchMessage( new ConnectMessage( ConnectMessage.CONNECT_SUCCESS ) ); } );
    }
    catch ( error : Error )
    {
      _instance.dispatchMessage( new DCFErrorMessage( DCFErrorMessage.CONNECT_FAILURE_ERROR ));
    }
  }
}
// Disconnects the DCF Bridge.
public static function disconnect( ) : void
{
  try
  {
    getInstance( )._client.close( );
  }
  catch ( error : Error )
  {
    // error closing the bridge
  }
}
// Static variables
// Holds the single instance of the Bridge */
private static var_instance : Bridge = null;
// Constructor.
public function Bridge( blocker : Bridge_SingletonBlocker )
{
  super( );
```

```
  _handlers = new Dictionary( );

// Try to initialize the _reader and _writer
  try
  {
    _reader = new READER_CLASS;
    _writer = new WRITER_CLASS; _
  }
  catch ( error : Error )
  {
    trace( error );
    return;
  }

_respondersMap = new Dictionary( );
}

// Reads the in the CONIFG_PATH location.
protected static function readConfig( ) : void
{
  var loader : URLLoader = new URLLoader( );
  loader.addEventListener( IOErrorEvent.IO_ERROR, function( event : Event ) : void
    {
    });
  loader.addEventListener( Event.COMPLETE, handleConfigLoadComplete );
  loader.addEventListener( SecurityErrorEvent.SECURITY_ERROR, function( event : Event
) : void
    {
      trace( "@#$@#$@#$@$@#$" );
    });
  loader.load( new URLRequest( CONFIG_PATH ));
}

// Event handler; responds to the complete event of the config loader.
protected static function handleConfigLoadComplete( e : Event ) : void
{
  try
  {
    var loader : URLLoader = e.target as URLLoader;
    var xml : XML = new XML( loader.data as String );

if ( isEmptyAttribute( xml.entry, PORT_STR ) == false )
    {
      Bridge.PORT = int( xml.entry.( @key == PORT_SIR ).toString( ));
    } if ( isEmptyAttribute( xml.entry, HOSTNAME) == false )
    {
      Bridge.HOST = xml.entry.( @key == HOSTNAME ).toString( );
    } if ( isEmptyAttribute( xml.entry, AUTO_CONNECT_STR ) == false )
    {
      Bridge.AUTO_CONNECT = xml.entry.( @key ==AUTO CONNECT_STR
).toString( ) == TRUE;
    } if ( isEmptyAttribute( xml.entry, READER) ==false )
    {
      var readerClassName : String = xml.entry.( @key == READER ).toString( );
      Bridge.READER_CLASS = getDefinitionByName( readerClassName ) as Class;
    } if ( isEmptyAttribute( xml.entry, WRITER) == false )
    {
      var writerClassName : String = xml.entry.( @key == WRITER ).toString( );
      Bridge.WRITER_CLASS = getDefinitionByName( writerClassName ) as Class;
    }
  }
  catch ( error : Error )
  {
    trace( error );
  }
}

// XML helper function
protected static function isEmptyAttribute( xmlList : XMLList, key : String ) : Boolean
{
```

```
    return xmlList.( @key == key ).toString( ) == EMPTY;
}

// Sends a message to the c# DCF bridge which is part of the Helper Service
public function sendMessage( message : IMessage, responder : IResponder=null ) : void
{
if ( Bridge.CONNECTED == false && AUTO_CONNECT == true )
  connect( );

if ( responder != null && message[ UID ] != null )
{
 _respondersMap[ message[ UID ]] = responder;
}

// Try to serialize the message using _writer.
try
{
 var bytes : ByteArray = _writer.write( message );
}

// If an error is caught, dispatch the DCFErrorEvent.SERIALIZATION_ERROR event.
catch ( error : Error )
{
  dispatchMessage( new DCFErrorMessage( DCFErrorMessage.SERIALIZE_ERROR,
message ));
}

// Write the message on the socket and flush the packets.
try
{
 _client.writeBytes( bytes );
 _client.flush( );
}

// If there is an error dispatch the DCFErrorMessage.SERIALIZE_ERROR message
 catch ( error : Error )
{
  dispatchMessage( new DCFErrorMessage( DCFErrorMessage.SERIALIZE _ERROR,
message ));
 }
}

// Event handler; responds to Event.CLOSING when dispatched by the application. Closes the
socket when this event has been dispatched.
private function handleApplicationClose( e : Event ) : void
{
 if ( Bridge.CONNECTED == true )
 {
  try
  {
   Bridge. disconnect( );
  }
  catch ( error : Error )
  {
   // Ignore any errors.. the application is closing.
  }
 }
}

// Event handler; Responds to IOErrorEvents from the _client socket.
private function handleIOError( event : Event ) : void
{
 _client = null;

dispatchMessage( new DCFErrorMessage(
DCFErrorMessage.CONNECT_FAILURE_ERROR ));
}

// Event handler; Responds to data sent by the c# DCF bridge.
private function handleReceiveSocketData( event : ProgressEvent ) : void
{
 try
 {
  var loopCount:int = 0;
  //Loop through the Socket buffer processing as many objects as we can.
  while (readNextObjectFromSocket( ))
  {
   loopCount++;
  //An array of 1 or more decoded messages. (Decoded by _reader)
```

```
    var messages : Array = _reader.read( _byteBuffer ).reverse( );
    //A local var of the message currently being dispatched.
    var message : IMessage = null;
    var decoded : Object = messages.pop( );
    if ( decoded is IMessage )
    {
     message = decoded as IMessage;
    }
    else
    {
     var m : Message = new Message( );
     m.type = decoded.type;
     m.data = decoded.data;
     m.uid = decoded.uid;
     message = m;
    }
    // While there are items in the array messages, dispatch the messages to
registered IMessageHandlers. If any IResponders were registered with the call, their result
methods are invoked as well.
    while ( message != null )
    {
     try
     {
      // Check in _respondersMaps to see if an IResponder has been
      // registered for this message. (Mapped by Message.uid.) Notify
      // the IResponder by invoking the result method.
      if ( _respondersMa[+ message[ UID ]] != null )
      {
       var responder : IResponder = _respondersMap[ message[ UID ]] as
IResponder responder.result( message );

_respondersMap[ message[ UID ]] = null;
      }
     }
     catch ( error : Error )
     {
      trace("Error processing bridge message " + error);
     }

// Dispatches the message to registered IMessageHandlers
     dispatchMessage( message );

// Get the next message in messages
     message = messages.pop( ) as IMessage
    }

// When all messages have been processed, reset _totalBytes to -1
    // to prepare for the next packet of binary data
    _totalBytes = -1;
    _totalBytesBuffer = new ByteArray( ) ;
    _byteBuffer = null;
   }
  }
  catch ( e : Error )
  {
   dispatchMessage( new DCFErrorMessage( DCFErrorMessage.DESERIALIZE_ERROR
));
  }
 }
 // This method will copy only one object from the Socket per pass into the _byteBuffer. If
the
 Socket does not have enough available data we will return false and catch it on the next
frame
 execution.
 private function readNextObjectFromSocket( ) : Boolean
 {
   if ( _client.bytesAvailable < 4 )
   {
    return false;
   }

// When _totalBytes is -1 we need to initialize the value from
   // the socket stream. The only time this will not be -1 is when
   // we do not yet have enough data in the socket to process.
   if ( _totalBytes == -1 )
   {
    _totalBytes = _client.readInt( );
   }
```

```
// Once we have established the number of bytes to read
//and the socket has that many available, read that many bytes
// into a ByteArray and return to process.
if ( _totalBytes > 0 && totalBytes <= _client.bytesAvailable )
{
  //For each successful pass the calling method will reset the
  // totalBytes to −1 and null out the _byteBuffer var.
  if ( _byteBuffer == null )
  {
    _byteBuffer = new ByteArray( );
  }

// Allways read one full object.
  _client.readBytes( _byteBuffer, 0, _totalBytes );
  return true;
}
return false;
}

// Registers an IMessageHandler to receive notifications when a certain message type is dispatched.
public function registerMessageHandler( type : String, handler : IMessageHandler ) : void
{
  // Get the list of handlers registered for the event type
  var list : Array = _handlers[ type ] as Array;
  // If the list is null, create a new list to add 'handler' to
  if ( list == null )
  {
    list = [];
    _handlers[ type ] = list;
  }

//Add the handler to the list
  list.push( handler );
}

// Unregisters a given handler.
public function unRegisterMessageHandler( type : String, handler : IMessageHandler ) : void
{
  // Get the list of handlers registered for the event type
  var list : Array = _handlers[ type ] as Array;

// If the list is not null and not empty, look for handler in the list and remove it, if a match is found
  if ( list != null && list.length > 0 )
  {
    var activeHandler : IMessageHandler = null;
    for ( var idx : int = 0; idx < list.length; idx++ )
    {
      activeHandler = list[ idx ] as IMessageHandler;

if ( activeHandler == handler )
      {
        list[ idx ] = null;
      }
    }
  }
}
// Dispatches an IMessage to registered listeners.
public function dispatchMessage( message : IMessage ) : void
{
  // Get the list of handlers registered for the event type
  var list : Array =_handlers[ message.type ] as Array;
  // If the list is not null and not empty notify the registered event handlers
  if ( list != null && list.length > 0 )
  {
    for each ( var handler : IMessageHandler in list )
    {
      if ( handler != null )
      {
        handler.handleMessage( message );
      }
    }
  }
}

// Variables
```

```
// The client socket that connects to the C# DCF bridge.
private var _client : Socket = null;

// The IReader used to deserialize data that comes across the c# DCF bridge.
private var _reader : IReader = null;

// The IWriter used to serialize data sent across the DCF bridge to c#.
private var _writer : IWriter = null;

// A buffer used to batch up fragmented messages
private var _byteBuffer : ByteArray = null;

// A map of responders keyed by Message uid. Used to callback from a successful response.
private var _respondersMap : Dictionary = null;

// The total number of bytes in the current packet being transmitted.
private var _totalBytes : int = −1;
private var _totalBytesBuffer : ByteArray = null;

// A dictionary of message handlers
private var handlers : Dictionary = null;

}
}

// The Bridge_SingletonBlocker class is a private inner class used to block the instantiation of
Bridge from outside of the Bridge class.
class Bridge _SingletonBlocker
{
}
```

The following code implements the IMessage interface and Message Class of type Message 130 part of the DCF Flex Library which is located as part of Web Application 112.

IMessage Interface Implementation

```
package merapi.messages
{
[Bindable]
// The IMessage interface describes a 'message' sent by the DCF bridge.
public interface IMessage
{
    // Properties
    // type
    // The message type.
        function get type( ) : String;
        function set type( val : String ) : void;
    // data
    // A generic data property.
        function get data( ) : Object;
        function set data( val : Object ) : void;
}
}
```

Message Class Implementation

```
package DCF.messages
{
import flash.net.registerClassAlias;
import DCF.Bridge;
import mx.rpc.IResponder;
import mx.utils.UIDUtil;
// The Message class implements IMessage, a 'message' sent from the
DCF UI layer.
public class Message implements IMessage
{
    // Needed for sending typed instances from Flash -> c# as Flash
doesn't parse the RemoteClass meta tag
        { registerClassAlias( "DCF.messages.Message", Message ); }
    // Constructor.
        public function Message( type : String = null, data : Object =
null ) : void
        {
            super( );
            this.type = type;
            this.data = data;
            this.uid= UIDUtil.createUID( );
        }
    // Properties
    // uid
    // A unique ID for the message.
        public var uid : String = null;
    // type
    // The type of the message.
        public function get type( ) : String { return __type };
        public function set type( val : String ) : void { __type = val; };
    // data
    // The data carried by this message.
    public function get data( ) : Object    { return __data };
        public function set data( val : Object ) : void { __data = val };
    // Redirects toString to the data property
    public function toString( ) : String
    {
        return uid + " " + (data != null ? data.toString( ) : "" );
    }
    // Sends the message across the DCF bridge.
    public function send( responder : IResponder = null ) : void
    {
        Bridge.getInstance( ).sendMessage( this, responder );
    }
    // Dispatchs message across on this side of the bridge.
    public function dispatch( ) : void
    {
        Bridge.getInstance( ).dispatchMessage( this );
    }
    // Used by the getters/setters.
        private var __type : String = null;
        private var __data : Object = null;
}
}
```

The following code implements the IMessageHandler interface and MessageHandler Class to add, remove and handle messages of type Message 130, which is part of the DCF Flex Library located as part of the Web Application 112.

IMessageHandler Interface Implementation

```
package DCF.handlers
{
import DCF.messages.IMessage;
// The IMessageHandler interface defines the methods for receiving a
Message from the Bridge.
public interface IMessageHandler
{
    // Handles an IMessage dispatched from the Bridge.
    function handleMessage( message : IMessage ) : void
}
}
```

MessageHandler Class Implementation

```
package DCF.handlers
{
import DCF.Bridge;
import DCF.messages.IMessage;
//The IMessageHandler interface defines the methods for receiving a
Message from the Bridge.
public class MessageHandler implements IMessageHandler
{
    // Automatically registers the handler for message type.
    // @param type The type of message to handle.
    public function MessageHandler( type : String = null ) : void
    {
        if ( type != null )
        {
            addMessageType( type );
        }
    }
    // Handles an IMessage dispatched from the Bridge. This method
shouldbe overridden by MessageHandler sub class definitions.
    public function handleMessage( message : IMessage ) : void { }
    // Adds another message type to be listened for by this instance of
MessageHandler.
    public function addMessageType( type : String ) : void
    {
        Bridge.getInstance( ).registerMessageHandler( type, this );
    }
    // Removes the handling of message type.
    public function removeMessageType( type : String ) : void
    {
        Bridge.getInstance( ).unRegisterMessageHandler( type,
this );
    }
}
}
```

The following code implements ConnectMessage class part of DCF Flex Library to handle connection status message types on the Web Application 112 client.

ConnectMessage Class Implementation

```
package DCF.connect
{
    import DCF.messages.Message;
    public class ConnectMessage extends Message
    {
        public static const CONNECT_SUCCESS : String =
"connectSuccess";
        public function ConnectMessage( type : String )
        {
            super( type );
        }
    }
}
```

The following code implements the DCFErrorMessage class part of the DCF Flex Library to handle errors part of the socket connection on the web Application 112.

DCFErrorMessage Class Implementation

```
package DCF.error
{
import flash.utils.Dictionary;
import DCF.messages.IMessage;
import DCF.messages.Message;
// The DCFErrorMessage class is a sub class of Message that is used to communicate error
messages from the Bridge
public class DCFErrorMessage extends Message
{
  // Event type for a serialization error.
  public static const SERIALIZE_ERROR : String = "serializeError";
  // Event type for a deserialization error.
  public static const DESERIALIZE_ERROR : String = "deserializeError";
  // Event type for a connect failure error.
  public static const CONNECT_FAILURE_ERROR : String = "connectFailureError";
  // Event type for an initialization error.
  public static const INITIALIZATION_ERROR   : String = "initializationError";
  // A map of event types -> error messages
    private static const ERROR_MESAGES : Dictionary = new Dictionary( );
    {
            ERROR_MESAGES[ SERIALIZE_ERROR ] = "Serialize error";
            ERROR_MESAGES[ DESERIALIZE_ERROR ] = "Deserialize error";
            ERROR_MESAGES[ CONNECT_FAILURE_ERROR ] = "Connect Failure";
            ERROR_MESAGES[ INITIALIZATION_ERROR ] = "Initialization Error";
    }
  // Constructor.
      public function DCFErrorMessage( type : String = null, message : IMessage = null ) :
void
    {
        super( type );
        this.message      = message;
    }
    //The message that failed to be seriliazed, in the case of a SERIALIZE_ERROR or
DESERIALIZE_ERROR.
    public var message : IMessage = null;
    // Updates the value of data with the matching error message based on the message type.
```

```
        override public function set type( val : String ) : void
        {
            super.type = val;
            data       = ERROR_MESAGES[ type ].toString( );
        }
    }
}
package DCF.messages
{
    public dynamic class DynamicMessage extends Message
    {
        public function DynamicMessage( )
        {
            super( );
        }
    }
}
```

The following code implements the disconnectDCF function part of the DCF Flex Library to handle the connection close/disconnect request from the Web Application 112.
disconnectDCF Function Implementation

```
package
{
import DCF.Bridge;
// Disconnects the DCF client/ui Bridge from the native Bridge.
public function disconnectDCF( ) : void
```

-continued

```
{
    Bridge.disconnect( );
}
}
```

The following code implements the JavaScriptExtension class part of the DCF Flex library which is located as part of Web Application 112. The following code registers all the actionscript methods that are exposed to JavaScript.

```
package DCF
{
import flash.external.ExternalInterface;
import flash.system.Security;
import merapi.handlers.MessageHandler;
import merapi.messages.DynamicMessage;
import merapi.messages.IMessage;
// The Message class implements IMessage, a 'message' sent from the DCF UI layer.
public class JavaScriptExtension extends MessageHandler
{
    // Constructor.
        public function JavaScriptExtension( )
        {
            Security.loadPolicyFile( 'xmlsocket://' + Bridge.HOST + ':12364' );
            Bridge.getInstance( );
            ExternalInterface.addCallback( "registerMessageHandler",
registerMessageHandler );
            ExternalInterface.addCallback( "unRegisterMessageHandler",
unRegisterMessageHandler );
            ExternalInterface.addCallback( "sendMessage", sendMessage );
            ExternalInterface.addCallback( "dispatchMessage", dispatchMessage );
            ExternalInterface.addCallback( "connectDCF", connectDCF );
            ExternalInterface.addCallback( "disconnectDCF", disconnectDCF );
            ExternalInterface.addCallback( "systemExecute", systemExecute );
            __handler = new JavaScriptHandler( );
        }
        private function alert( o : Object ) : void
        {
            ExternalInterface.call( "alert", o );
        }
    public function registerMessageHandler( type : * ) : void
    {
        __handler.removeMessageType( type );
        __handler.addMessageType( type );
    }
    public function unRegisterMessageHandler( type : * ) : void
    {
        __handler.removeMessageType( type );
    }
    public function sendMessage( message : * ) : void
    {
        var m : DynamicMessage = new DynamicMessage( );
        for ( var propName : String in message )
        {
```

```
            if ( !( m[ propName ] is Function ) )
            {
                    m[ propName ] = message[ propName ];
            }
        }
        m.send( );
    }
    public function dispatchMessage( message : * ) : void
    {
        var m : DynamicMessage = new DynamicMessage( );
        for ( var propName : String in message )
        {
            if ( !( m[ propName ] is Function ) )
            {
                    m[ propName ] = message[ propName ];
            }
        }
        Bridge.getInstance( ).dispatchMessage( m );
    }
    protected var __handler : JavaScriptHandler = null;
}
}
import DCF.handlers.MessageHandler;
import DCF.messages.IMessage;
import flash.external.ExternalInterface;
class JavaScriptHandler extends MessageHandler
{
        override public function handleMessage( message : IMessage ) : void
        {
                ExternalInterface.call( "handleDCFMessage", message );
        }
}
```

The above code may be used to implement the client DCF Flex Bridge, which enables the connection between Web Application 112 and Helper Service 140. When the JavaScript from the HTML DOM executes connectRADCF part of Web Application 112 that invokes bridge.connectDCF method of DCF Flex Library part of Web Application 112 which is available through actionscript's externalinterface. Now the DCF Flex Library part of Web Application 112 establishes a socket connection on the specified port with the DCF C# Library part of Helper Service 140. Once the connection is successfully established between the Web Application 112 and the Helper Service 140, the Web Application 112 proceeds with further work flow process depends on the requirements that application needs to satisfy.

The following code is customized to the workflow process or requirements or intended purpose of the figures attached. The following workflow process tracks along with FIG. 6, the purpose of which is to allow a Web Application 112 running on a first computing device 110 with Helper Service 140 installed to communicate to a second computing device 120, which in this example is an android device.

Step 1: Message Creation 114 by Web Application 112 on Computing Device 110

Before the step of Message Creation 114 in this example, Web Application 112 registers required Message Types with the DCF Flex Bridge Instance part of Web Application 112 using the MessageHandler's AddMessageType illustrated in the JavaScript MessageHandler Prototype implementation.

```
//code to register the Message Types for this process
function registerRaVtDeviceInterpreterMessageTypes( ) {
   var connectHandler = new MessageHandler( );
   connectHandler.addMessageType(RaVt_INTERPRETER_MESSAGE_HANDLER);
   connectHandler.handleMessage = responsefromDevice(message);
}
        The next step is Message Creation 114. The following code creates the message 130 to
request to connect to external Android device 120 and sends that to the Android Device 120
through the established connection between Web Application 112 and Helper Service 140.
function sendMessage( ) {
//message (130)
   var message = new Message( );
//specifies the registerd message type, which in this case acts as target
   message.type (136) = RaVt_INTERPRETER_MESSAGE_HANDLER;
//specifies the data object or string or constant or any arbitrary value
Var Data =
'{"Command":"DEVICE_CONNECT_REQUEST","Mode":"REQUEST","Count":1,"HasData":
true,"Data":{"Serial":"015D941A0B01E02B","Path":"C:\\ProgramData\\RaVt\\Install\\RaVtAndroid
Support.apk"},"HasError":false,"Error":{ }}';
   message.data (134) = Data;
//invokes the javascript prototype send method illustrated below
   message.send( );
//message id (132) is auto-generated in the DCF Flex library
}
```

```
//The following method invokes the DCF Flex library sendMessage through external interface
Message.prototype.send = function( )
{
    bridge.sendMessage( this );
}
//DCF Flex Library sendMessage implementation which serializes the message using AMF and
writes the message on the socket
public function sendMessage( message : IMessage, responder : IResponder=null ) : void
    {
    // Try to serialize the message using AMF __writer.
        var bytes : ByteArray = __writer.write( message );
    // Write the message on the socket and flush the packets.
        __client.writeBytes( bytes );
        __client.flush( );
    }
//DCF C# Library's BridgeListenerThread reads data from the input stream of the accepted client
socket connection as below and dispatches the message using Bridge Instance DispatchMessage
as illustrated below
public void Run( )
{
// reads all the bytes from the input stream, check the illustrated for details, uses the AMF reader
    __reader.read(bytes);
// Broadcast the Message from the Bridge
    Bridge.GetInstance( ).DispatchMessage( message );
}
public void DispatchMessage( IMessage message )
{
// Checks to see if there is any handlers registered by helper services for this message type
"RaVt_INTERPRETER_MESSAGE_HANDLER"
        if ( __handlers.ContainsKey(message.type) == false )
        {
            return;
        }
        else
        {
// if it finds list of handlers for this message type then it invokes each handler's HandleMessage
which is overrided in the ListenerMessageHandler
            list = __handlers[message.type];
            if ((list != null) && (list.Count > 0))
            {
                foreach (IMessageHandler handler in list)
                {
                    handler.HandleMessage(message);
                }
            }
        }
}
//DCF C# Helper Service's ListenerMessageHandler handles the message type using the
overridden HandleMessage Method.
public ListenerMessageHandler( )
{
AddMessageType(RaVt_INTERPRETER_MESSAGE_HANDLER);
}
//handling the message type to fulfill the requirements or workflow process
public override void HandleMessage( IMessage message )
{
if ( message.type.Equals(RaVt_INTERPRETER_MESSAGE_HANDLER) )
    {
            //customized method to do the required actions or execution
        HandleInterPreterMessage(message);
    }
}
```

As enabled by the code shown above, the device agnostic message 130 created by the Web Application 112 has now reached Helper Service 140. The Helper Service 140 now passes the device agnostic message 130 to Android Device 120, which contains the native android application 122.

In order to send the message to the android device 120, a device interpreter class part of Helper Service 140 is implemented, which can be a customized class for any action that needed to fulfill the device agnostic message 130.

```
//Implementation of a wrapper class for DeviceInterpreter API
class RaVtDeviceInterpreterWrapper
```

```
{
    //deviceinterpreter API class
    private DeviceInterpreter deviceInterpreter = null;
    //deviceinterpreterlistener class
    private DeviceInterpreterListener deviceInterpreterListener = null;
    public RaVtDeviceInterpreterWrapper( )
    {
        deviceInterpreterListener = new DeviceInterpreterListener( );
        deviceInterpreter = new
        DeviceInterpreter(deviceInterpreterListener);
        deviceInterpreter.initialize(deviceDetails.ToString( ));
    }
```

-continued

```
// sends the message to the device using the deviceInterpreter API
public void sendClientMessageToADB(string jsondata)
{
   deviceInterpreter.sendRequest(RequestID, jsondata);
}
}
```

The following code receives the response message 126 or callback 124 from the Android Device 120 which is then packaged as device agnostic message 130 and sent back to the web Application 112 from the Helper Service 140 using the established socket connection.

```
//Device Interpreter Listener class responsible to handle the callback from
the device which sends messages or responses back through device
interpreter
  public class DeviceInterpreterListener : IDeviceInterpreter
  {
     // handles the Message or Callback from Android Application (122)
     public void MessageCallback(string responseid, string responsemsg)
     {
         //message (126) generated from android application(122)
part of the Android device (120)
         Message m = new Message( );
              //type which acts as target
              m.type = RaVt_INTERPRETER_MESSAGE_HANDLER;
              //response data back to web application
              m.data = respmsg;
              //send invokes the DCF C# library's send method of the
Message class illustrated earlier
              m.send( );
     }
  }
//Message class send method
public void send( )
{
     //invokes the bridge sendMessage to send the message across the
bridge through the socket connection
         Bridge.GetInstance( ).SendMessage( this );
}
//following method part of DCF C# library Bridge.cs class
public void SendMessage( IMessage message )
     {
         // Serializes the message using AMT Writer
              byte[ ] bytes = __writer.write( message );
         // Send the length of the message first
         byte[ ] lenBytes = new byte[4];
         lenBytes[0] = (byte)(bytes.Length >> 24);
         lenBytes[1] = (byte)(bytes.Length >> 16);
         lenBytes[2] = (byte)(bytes.Length >> 8);
         lenBytes[3] = (byte)bytes.Length;
         //send the header
         __client.Send(lenBytes);
         __client.Send(bytes);
     }
//DCF Flex Library handleReciveSocketData reads all the input stream
private function handleReceiveSocketData( event : ProgressEvent ) : void
{
     var messages : Array = __reader.read( __byteBuffer ).reverse( );
// decodes the message to of type Message (130).
     var message : IMessage = null;
     var decoded : Object = messages.pop( );
     message = decoded as IMessage;
// Dispatchs the message to registered IMessageHandlers
     dispatchMessage( message );
}
```

The following code dispatches the message from DCF C# Library part of Helper Service 140 to the JavaScript part of the Web Application 112 using the handleDCFMessage externalinterface implementation.

```
public function dispatchMessage( message : IMessage ) : void
{
// Get the list of handlers registered for the
RaVt_INTERPRETER_MESSAGE_HANDLER message type
     var list : Array = __handlers[ message.type ] as Array;
     // invokes the handleMessage of the registered Messagehandlers
     handler.handleMessage( message );
}
// The handleMessage class invokes the overrided method of the
JavaScriptHandler class.
override public function handleMessage( message : IMessage ) : void
{
//invokes the handleDCFMessage JavaScript method part of the web
application.
ExternalInterface.call( "handleDCFMessage", message );
}
```

The handleDCFMessage method of the Web Application 112 as illustrated below invokes the respective handler methods or actions mapped to handlersMap array part of javascript implementation part of Web Application 112 based on the message target 136.

```
function handleDCFMessage(message) {
     // The list of handlers registered for messsage.type
     var list = handlersMap[ message.type ];
     // since we have the connectHandler registered for this message
     type
     //it invokes the connectHandler handleMessage which invokes the
     responsefromdevice( )
     connectHandler.handleMessage( message );
}
function responsefromDevice(message) {
     // the message (126) from the device reached the web application
     using the DCF bridge
//specifies the data object or string or constant or any arbitrary value
     Var Respmsg = message.data (134);
     //sample response message
Respmsg:
"{"Command":"DEVICE_CONNECT_REQUEST","Data":{"Serial":
"015D941A0B01E02B","Approved":true,"Path":"C:\\ProgramData\\
RaVt\\Install\\RaVtAndroidSupport.apk"},"HasData":true,"Count":1,
"HasError":false,"Mode":"RESPONSE"}"
}
```

Thus, this example code demonstrates how a device agnostic message 130 begun by creating a message 114 from Web Application 112 on the first computing device 110 through the use of the Helper Service 140, the message 130 then being passed to the android device 120 containing the native android application 122. The android application 122 can execute instructions based upon the data of the message, and further respond by creating a message 126 or callback 124 with instructions to Web Application 112.

A further variant of the present invention is shown in FIG. 8. In this preferred embodiment, the communication system 200 of the preset invention comprises a first computing device 210, a second computing device 220 and a third, intermediary computing device 230. In this embodiment of the present invention, the intermediary computing device 230 could comprise a cloud based device communications framework which enables communication between the first computing device 210 and the second computing device. For instance, the address component 236 of an initial device agnostic message from a first computing device (e.g., a desktop) to a second computing device (e.g., a smartphone) might lack the socket address of the second computing device and instead have only the phone number of the target smartphone, but the cloud computing intermediary computing device could use, for instance, a database (not shown) to look up the IP address of the smart phone to facilitate the ongoing communication and control abilities as described above. Likewise, the features of certain other embodiments could be combined within the bounds of this embodiment. For instance, the use of intent 236 could be employed to permit a first device to send out communications which would be interpreted and acted upon only by a subset of applications from a group of remote mobile computing devices such as second computing device 220. A specific embodiment of this implementation is where a multiple users walk into a store, and the store operator is periodically generating generic messages to be received and acted upon by responsive mobile computing devices, e.g., a phone store polling phones for diagnostic information of customers coming into the store to permit better support.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, the references to web browsers and presentation applications as shown in certain preferred embodiments of present invention are for illustrative purposes only with reference to the example drawings only. Likewise, it will be appreciated by those skilled in the art that various changes, additions, omissions, and modifications can be made to the illustrated embodiments without departing from the spirit of the present invention. All such modifications and changes are intended to be covered by the following claims.

We claim:

1. A system using a connection technology framework for facilitating communication between at least a plurality of applications comprising: a) a first computer device; b) a first application on the first device, including a first set of computerized instruction data on the first computer device from; c) a plurality of other applications on the first device, including a second application; and d) a helper service residing on at least the first application and plurality of other applications for creating a device agnostic message using the first set of computerized instruction data and target information for the device agnostic message that relates to the second application of the device agnostic message from amongst the plurality of applications; whereby the first application and the second application can communicate via device agnostic messages and callback messages and the first application and second application process such device agnostic messages without requiring common platforms or computer operating systems, wherein the device agnostic message is computerized communication data provided to an intended target which includes or is derived from at least both native data from a computer platform sending the communication as well as translation data such that the message is processed by the second application.

2. A system using a connection technology framework for facilitating communication between at least a plurality of applications comprising: a) a first computer device; b) a first application on the first device, including a first set of computerized instruction data on the first computer device from; c) a second computer device; c) at least a second application on the second computer device, d) a helper service residing on at least the first computer device and the second computer device for creating a device agnostic message using the first set of computerized instruction data and target information for the device agnostic message that relates to the second application of the device agnostic message from amongst the plurality of applications; whereby the first application and the second application can communicate via device agnostic messages including callback messages, and the first application and second application process such device agnostic messages without requiring common platforms or computer operating systems, wherein the device agnostic message is computerized communication data provided to an intended target which includes or is derived from at least both native data from a computer platform sending the communication as well as translation data such that the message is processed by the second application.

3. A system using a connection technology framework for facilitating communication between at least a plurality of applications comprising: a) a first computer device; b) a first application on the first device, including a first set of computerized instruction data on the first computer device from; c) a second computer device; c) at least a second application on the second computer device, d) a helper service accessible by at least the first computer device and the second computer device for creating a device agnostic message using the first set of computerized instruction data and target information for the device agnostic message that relates to the second application of the device agnostic message from amongst the plurality of applications; whereby the first application and the second application can communicate via device agnostic messages including callback messages, and the first application and second application process such device agnostic messages without requiring common platforms or computer operating systems, wherein the device agnostic message is computerized communication data provided to an intended target which includes or is derived from at least both native data from a computer platform sending the communication as well as translation data such that the message is processed by the second application.

* * * * *